July 23, 1963 W. S. GUBELMANN 3,098,609
CALCULATING MACHINE DRIVING MECHANISM AND THE LIKE
Original Filed Nov. 6, 1950 17 Sheets-Sheet 1

INVENTOR
William S. Gubelmann, deceased,
by Walter S. Gubelmann, executor,
by Burgess, Ryan & Hicks
Attys.

July 23, 1963 W. S. GUBELMANN 3,098,609
CALCULATING MACHINE DRIVING MECHANISM AND THE LIKE
Original Filed Nov. 6, 1950 17 Sheets-Sheet 2

INVENTOR.
William S. Gubelmann,
deceased.
BY Walter S. Gubelmann,
executor.
by Burgess, Ryan & Hicks.
Atty.

July 23, 1963   W. S. GUBELMANN   3,098,609
CALCULATING MACHINE DRIVING MECHANISM AND THE LIKE
Original Filed Nov. 6, 1950   17 Sheets-Sheet 3

INVENTOR
William S. Gubelmann, deceased.
by Walter S. Gubelmann, executor,
by Burgess, Ryan Hicks,
Attys.

INVENTOR
William S. Gubelmann, deceased,
by Walter S. Gubelmann, executor,
by Burgess, Ryan & Hicks
Atty.

July 23, 1963
W. S. GUBELMANN
3,098,609
CALCULATING MACHINE DRIVING MECHANISM AND THE LIKE
Original Filed Nov. 6, 1950
17 Sheets-Sheet 5
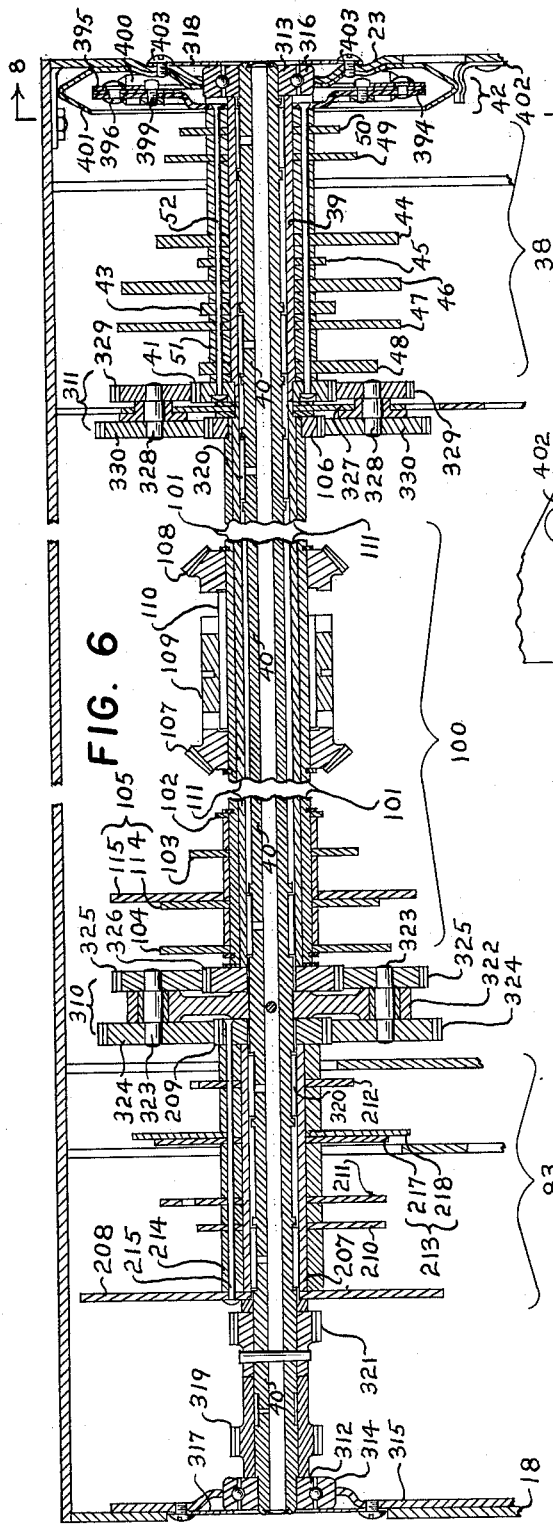
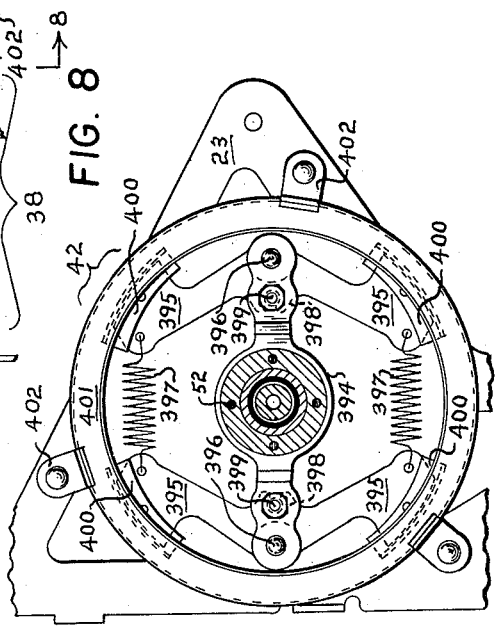
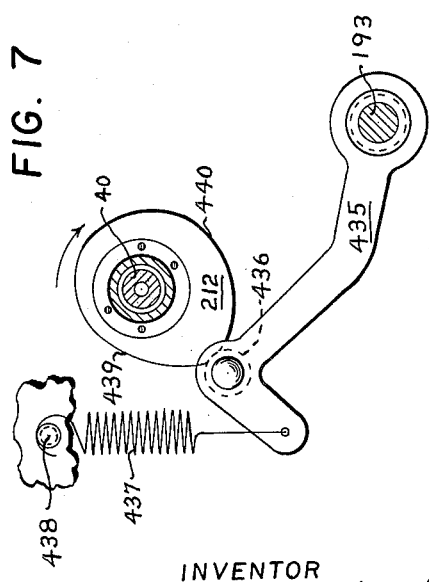
INVENTOR
William S. Gubelmann, deceased.
by Walter S. Gubelmann, executor
by Burgess, Ryan & Hicks
Attys.

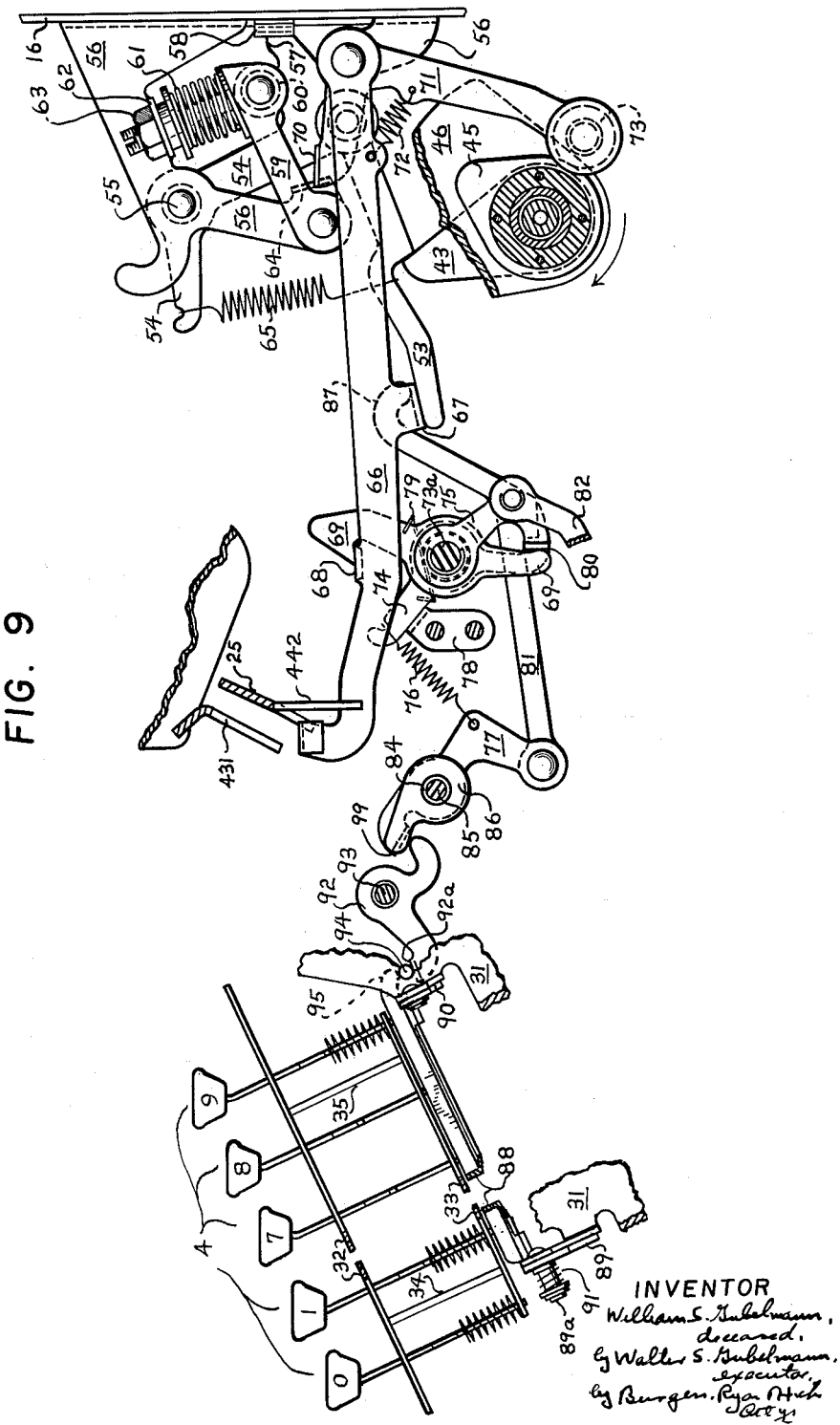

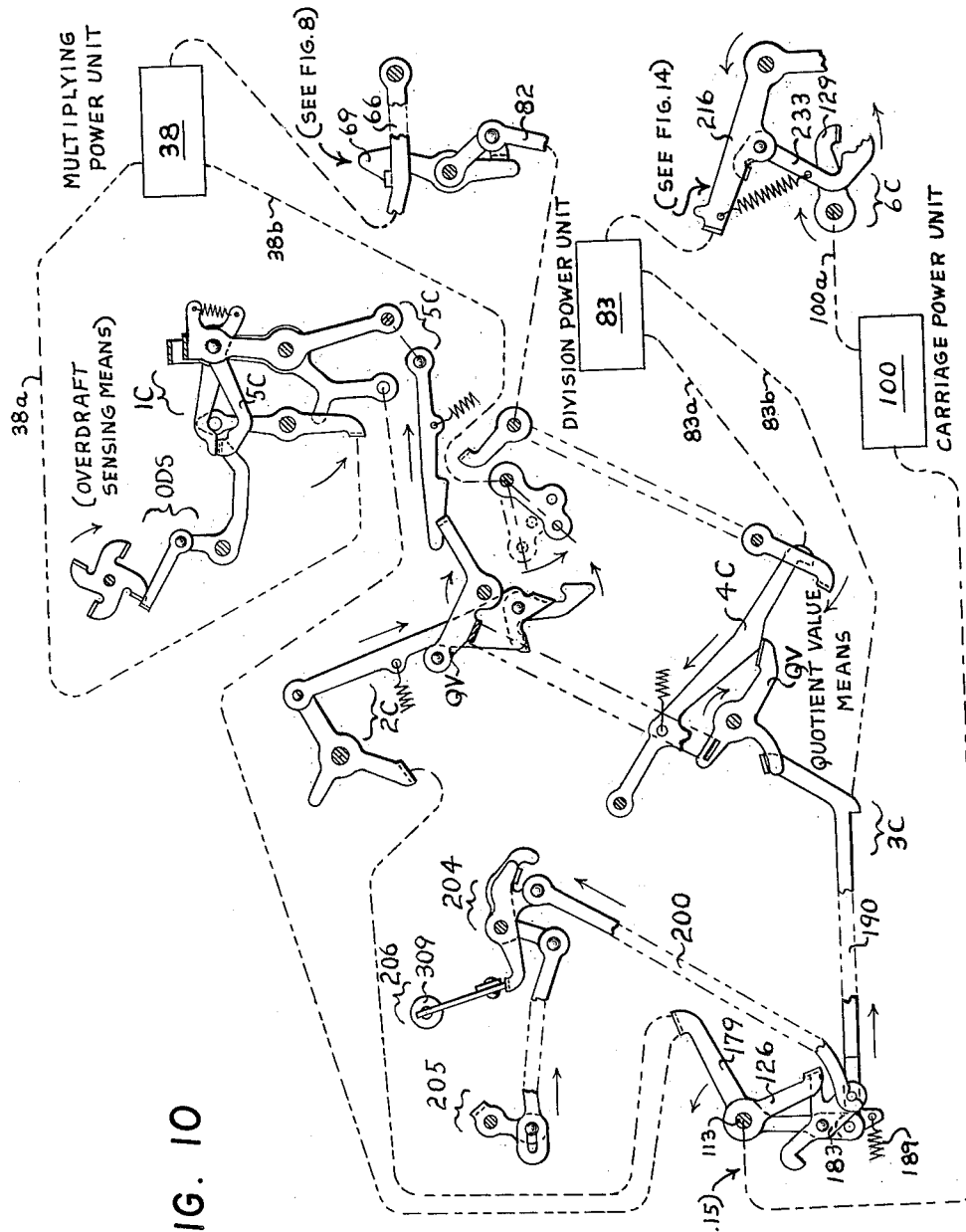

July 23, 1963   W. S. GUBELMANN   3,098,609
CALCULATING MACHINE DRIVING MECHANISM AND THE LIKE
Original Filed Nov. 6, 1950   17 Sheets-Sheet 8

INVENTOR
William S. Gubelmann, deceased.
by Walter S. Gubelmann, executor,
by Burgess, Ryan Hicks
attys.

INVENTOR
William S. Gubelmann, deceased.
by Walter S. Gubelmann, executor.
by Burgess, Ryan & Hinks,
Attys.

July 23, 1963 W. S. GUBELMANN 3,098,609
CALCULATING MACHINE DRIVING MECHANISM AND THE LIKE
Original Filed Nov. 6, 1950 17 Sheets-Sheet 10

INVENTOR
William S. Gubelmann,
deceased.
by Walter S. Gubelmann
executor
by Burgen, Ryan & Hecht
attys.

July 23, 1963   W. S. GUBELMANN   3,098,609
CALCULATING MACHINE DRIVING MECHANISM AND THE LIKE
Original Filed Nov. 6, 1950   17 Sheets-Sheet 11

INVENTOR
William S. Gubelmann, deceased.
by Walter S. Gubelmann, executor.
by Burgess, Ryan & Hicks
attys.

July 23, 1963 W. S. GUBELMANN 3,098,609
CALCULATING MACHINE DRIVING MECHANISM AND THE LIKE
Original Filed Nov. 6, 1950 17 Sheets-Sheet 12
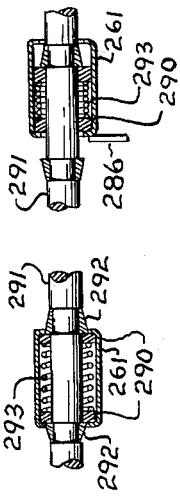
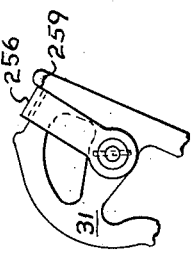
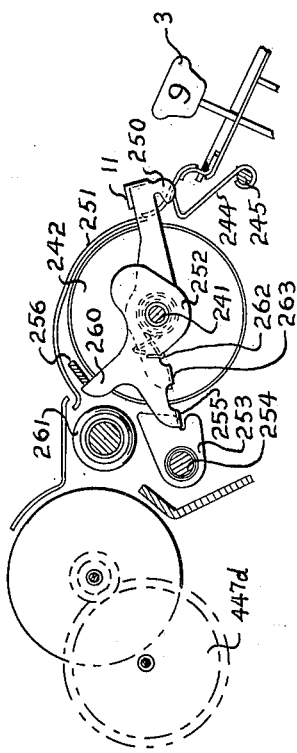
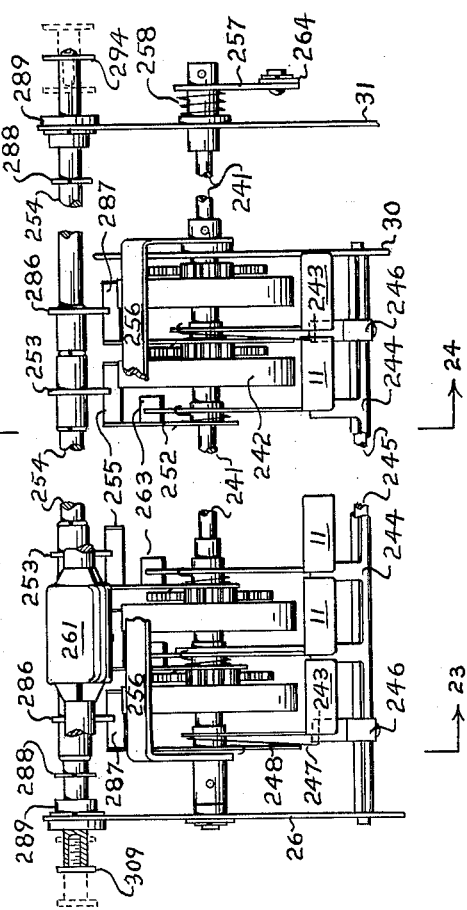
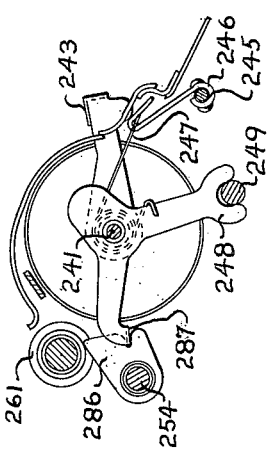
INVENTOR
William S. Gubelmann, deceased
by Walter S. Gubelmann, executor,
by Burgess, Ryan & Hicks
atty.

INVENTOR
William S. Gubelmann,
deceased.
by Walter S. Gubelmann,
executor,
by Burgen, Ryan Hicks
Attys.

July 23, 1963 W. S. GUBELMANN 3,098,609
CALCULATING MACHINE DRIVING MECHANISM AND THE LIKE
Original Filed Nov. 6, 1950 17 Sheets-Sheet 14
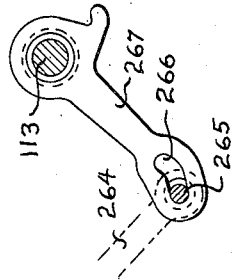
FIG. 27
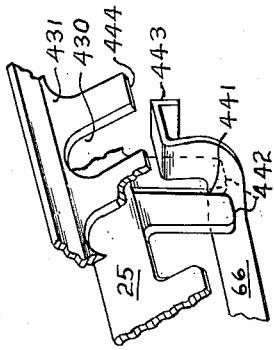
FIG. 29
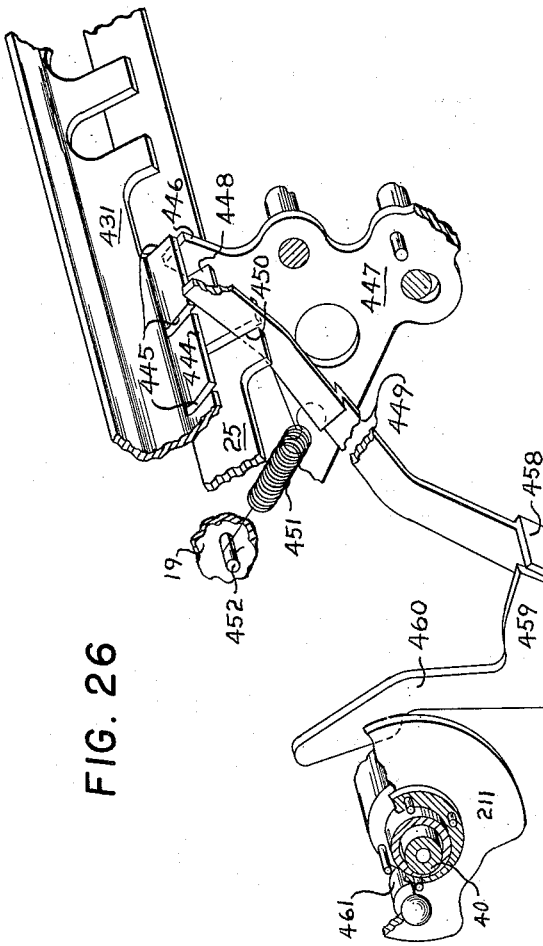
FIG. 28
FIG. 26
INVENTOR
William S. Gubelmann,
deceased
by Walter S. Gubelmann,
executor,
by Burgess, Ryan Hinkle
Attys.

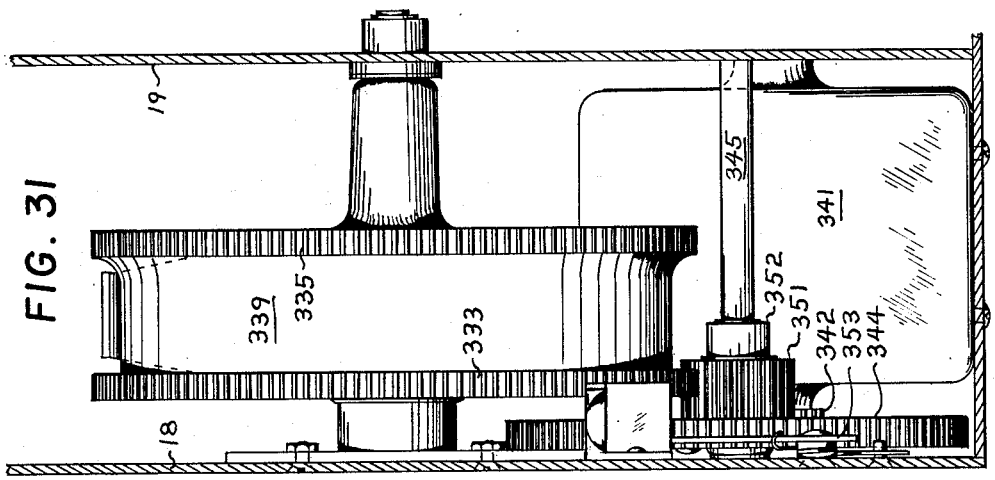
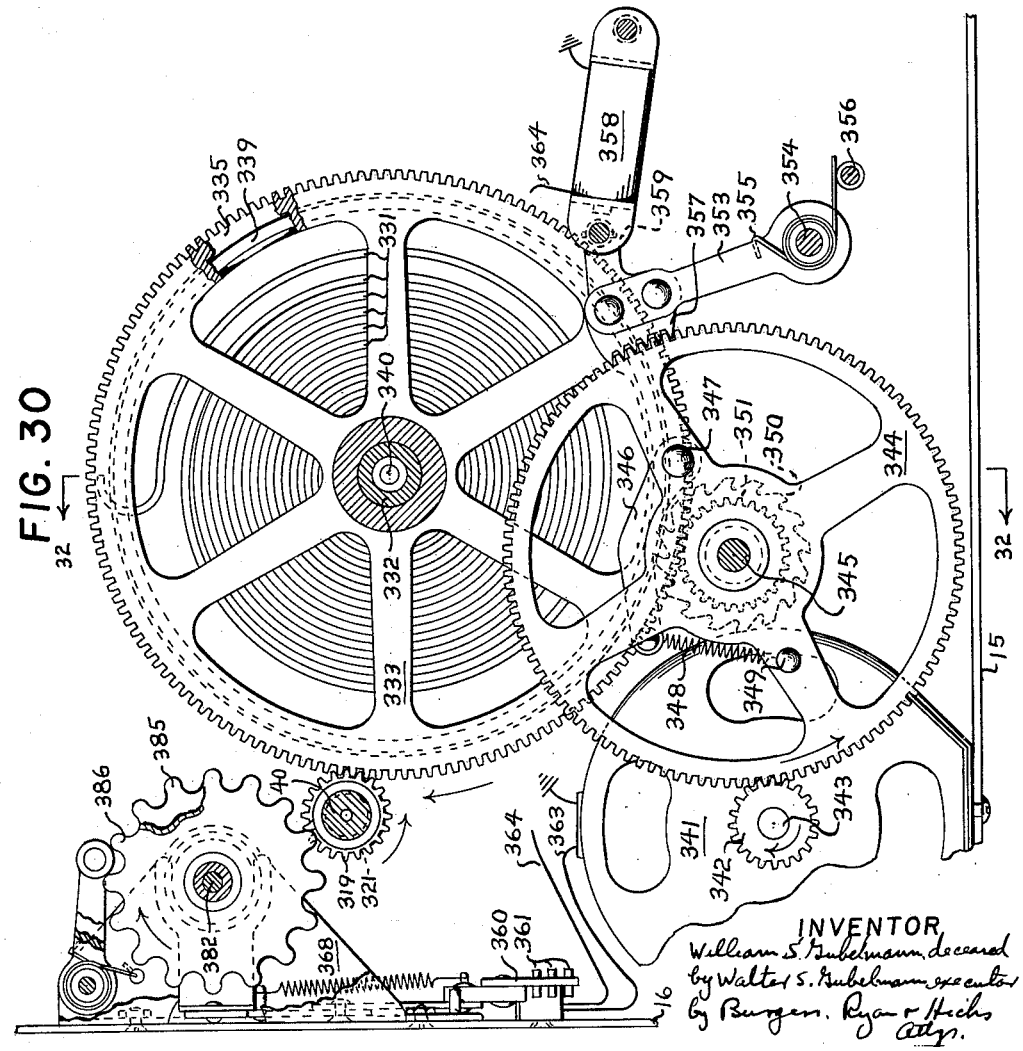

July 23, 1963  W. S. GUBELMANN  3,098,609
CALCULATING MACHINE DRIVING MECHANISM AND THE LIKE
Original Filed Nov. 6, 1950  17 Sheets-Sheet 16
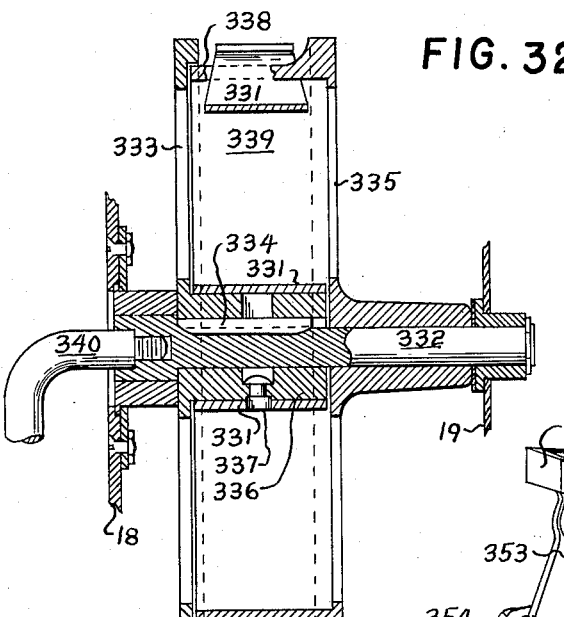
FIG. 32
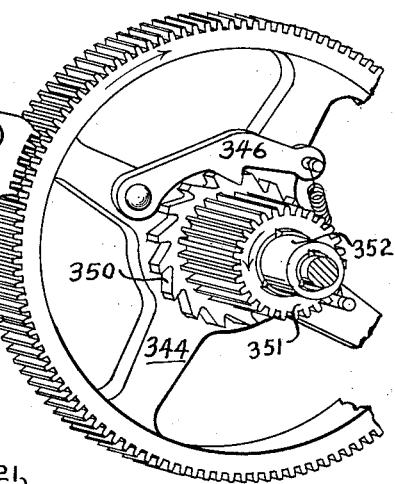
FIG. 33
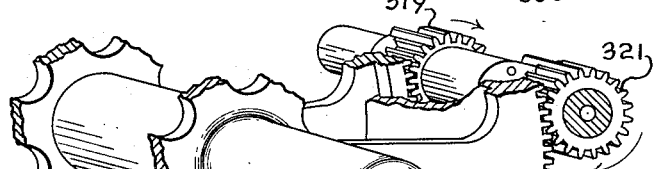
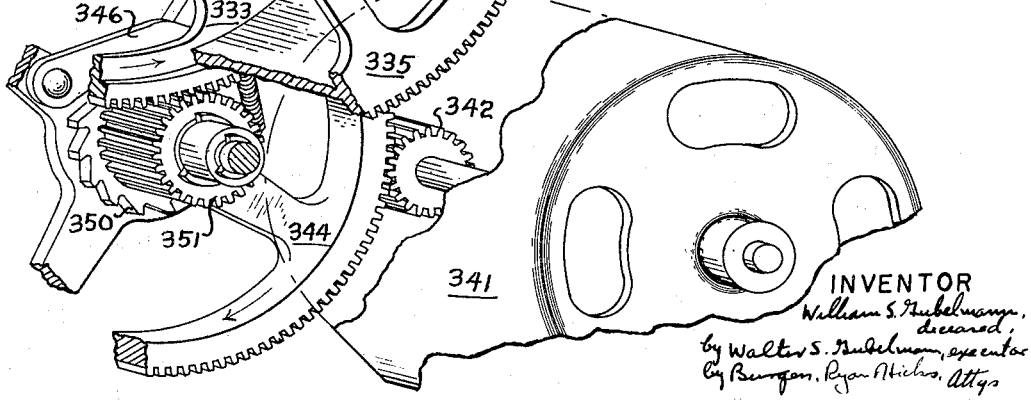
FIG. 34

INVENTOR
William S. Gubelmann, deceased
by Walter S. Gubelmann, executor
by Burgess, Ryan & Hicks, Attys.

United States Patent Office 3,098,609
Patented July 23, 1963

3,098,609
CALCULATING MACHINE DRIVING MECHANISM AND THE LIKE
William S. Gubelmann, deceased, late of Convent, N.J., by Walter S. Gubelmann, executor, Oyster Bay, N.Y.; said William S. Gubelmann assignor to Realty and Industrial Corporation, a corporation of Delaware
Original application Nov. 6, 1950, Ser. No. 194,273, now Patent No. 2,969,177, dated Jan. 24, 1961. Divided and this application Oct. 7, 1960, Ser. No. 61,322
24 Claims. (Cl. 235—62)

This invention relates to machines having several independently operable mechanisms and has particular reference to driving means for operating the several mechanisms either individually or concurrently in various combinations.

More specifically, the invention relates to automatically powered motor means which continually exerts drive forces on each of several driving units, each of which operates a different mechanism upon actuation of initiating keys appropriate to that driving unit, each of such mechanisms include controls operable automatically for initiating sequential operation of others of the driving units.

An object of the invention is to provide a calculating machine in which there is a power drive shaft coupled to a motive source through a spring-type energy accumulator, the construction being such as to employ the motive source to maintain the energy accumulator at all times in a state of readiness to turn the power drive shaft without the need for continuously running the motive source.

An object of the invention is to provide a novel and improved calculating machine in which there are several discrete mechanisms, operable independently, a spring type actuator common to said mechanisms and normally in wound condition for operating said mechanisms through several cycles of operation, and a motive source coupled to said actuator for restoring said actuator to wound condition, said motive source being brought into operation automatically by said actuator when said actuator unwinds a predetermined extent.

Another object of the invention is to provide a novel and improved calculating machine in which there is an ordinally shiftable carriage, several discrete mechanisms operable individually, one of said mechanisms being a shifting mechanism for traversing said carriage and the others being computing mechanisms, a spring-type actuator common to said mechanisms and normally in wound condition for operating said mechanisms through several cycles of operations, an initiating means individual to each mechanism and operable for instituting a cycle of operations of the respective mechanism, and means individual to each initiating means for each computing mechanism and effective for preventing actuation of the respective initiating means when said carriage is blocked, as by a wall, partition, etc., between two adjacent ordinal positions.

Another object of the invention is to provide a novel and improved calculating machine in which there is a main power drive shaft connected to a wound spring energy accumulator which in turn is coupled to a motive source for being maintained thereby in a substantially wound condition to drive the shaft, the device including a plurality of discrete drive units carried by the main power drive shaft and means drivingly coupling the drive units with the power drive shaft for being turned thereby selectively individually, or in combinations or groups for driving any section or sections of the calculator as needed for various computation operations.

A further object of the invention is to provide a novel and improved calculating machine in which there is a main power drive shaft continuously impelled to rotate, a plurality of discrete sleeve members rotatably carried on the main power drive shaft and coupled by novel planetary gear means to the drive shaft for being driven thereby individually or in groups, each of the sleeve members carrying thereon suitable cams for cyclically actuating the related portions of the calculating machine such as for multiplication, division, addition, subtraction, and carriage shifting, and also including novel stop-start means for each sleeve member for effecting stopping and allowing starting of the related sleeve member.

Still another object of the invention is to provide a novel and improved calculating machine in which there is a spring motor automatically maintained in wound condition by a source of motive power, a main power distributing drive shaft connected to the spring motor for being continuously impelled thereby to rotate, there being, for example, three sleeve-based individual cam carrying drive units, each rotatable on the main shaft for actuating its related mechanism, such as for multiplication and division computations and for carriage shifting, a first differential being rotatably mounted on the main shaft and engaged directly with two of the drive units for rotating the drive units individually or concurrently, there being a second differential pinned to the main shaft for being turned directly thereby, the first differential being engaged with the second differential through a supplemental sleeve and with the third of said drive units for directly rotating the third drive unit and the second differential individually or concurrently, and also including novel shock absorbing stop-start devices, each individual to and normally engaged with its own drive unit for blocking rotation thereof and of said main shaft when all drive units are blocked, the stop-start devices being selectively operable, each to disengage from its related drive unit thereby liberating said drive unit and said drive shaft to rotate.

Still a further object of the invention is to provide a novel and improved calculator of the type described, in which the main power drive shaft extends through a number of coaxial sleeve-based drive units each being intended for actuating its own related mechanism, such as for multiplication and division computation and for carriage shifting, the construction being such as to allow the main drive shaft to turn only when any one of the drive units or combinations thereof are unblocked for being rotated by the main shaft, and so that blocking of all the drive units against rotation simultaneously blocks turning of the main drive shaft, thereby conserving the stored energy provided for rotating the main shaft and hence making it feasible to employ a spring-type energy accumulator for driving the main shaft, and to use a relatively small compact conventional type of electric motor for automatically periodically restoring the spring to suitably wound condition.

Another object of the invention is to provide a novel and improved calculator including a main drive shaft and one or more driving units continually urged thereby to rotate, each driving unit including a plurality of cams turnable therewith and also novel stopping and starting means including a detent normally extending into the path of one of the cams to block turning of the cam and therethrough of the driving unit, there being a rockable latching means normally holding the detent in blocking position, the latch means being responsive to both automatic and manual actuation for allowing disengagement of the detent from the drive unit thereby initiating rotation of the drive unit, and including a cam follower actuated by another of the cams for returning the detent into the path of the related cam for stopping the cam at the completion of one revolution, there being a tensioned spring cooperating with the detent for taking up and cushioning the stopping shock, and a spring adjusting means for varying the tension effect of the spring.

Another object of the invention is to provide a novel and improved calculating machine in which there is a shiftable carriage, a multiorder register, multiplying, dividing and carriage shifting mechanisms, there being a source of motive power, and also individual driving units for each of the mechanisms, and continuously under rotative bias, with a plurality of specialized controls for bringing about and coordinating efficient programing of sequence of operations of the involved driving units as required, depending on the type of computation and the resulting digital values involved, whereby the necessary cycling of the driving units is reduced to a minimum.

Another object of the invention is to provide a novel and improved stop-start device for use in a calculator in which device there is a first plate member turnable with a driving unit of the calculator, and a second plate member resiliently secured to the first plate member for turning substantially therewith, there also being a detent releasably engageable with the second plate member for stopping its motion and consequently halting the driving unit quickly while absorbing any resulting shock to the parts, the stop-start device being compact and made of few parts to fit easily into the machine and being sturdy and rugged in use.

A further object of the invention is to provide a novel and improved calculating machine in which the construction of the major computing mechanism and means for driving them is such that the successive operations during the division computation are not dependent upon the occurrence of an overdraft involving negative nines in each cycle of operations, and hence the need for eliminating said negative nines is largely avoided.

The above and other objects and advantages of the invention will be more readily understood upon reference to the following disclosure. It will be apparent, however, that those skilled in the art will be enabled to apply the teachings of this disclosure to various modifications as intended to be covered by the scope of the appended claims. The specification is directed to an exemplary embodiment of the invention as illustrated in the accompanying drawings wherein:

FIGURE 6 is a fragmentary sectioned view of the drive shaft, and including, among other parts, three power units, two differentials for connecting the drive units with the shaft and a governor for one of the drive units;

FIGURE 7 is a left side view of a governor means for one of the power units in FIGURE 6;

FIGURE 8 is a left sectional elevational view of a governor taken on plane 8—8 in FIGURE 6;

FIGURE 9 is a fragmentary right side elevation taken on plane 9—9 of FIGURE 1 and showing the multiplying power unit stop-start means, the multiplier keys and means operable thereby for triggering the stop-start means;

FIGURE 10 is a schematic and partly diagrammatic illustration of the three power units, and of the several controls for initiating sequential operations of one unit by another unit in combinations dependent on the type of problem being commputed;

Figure 1:
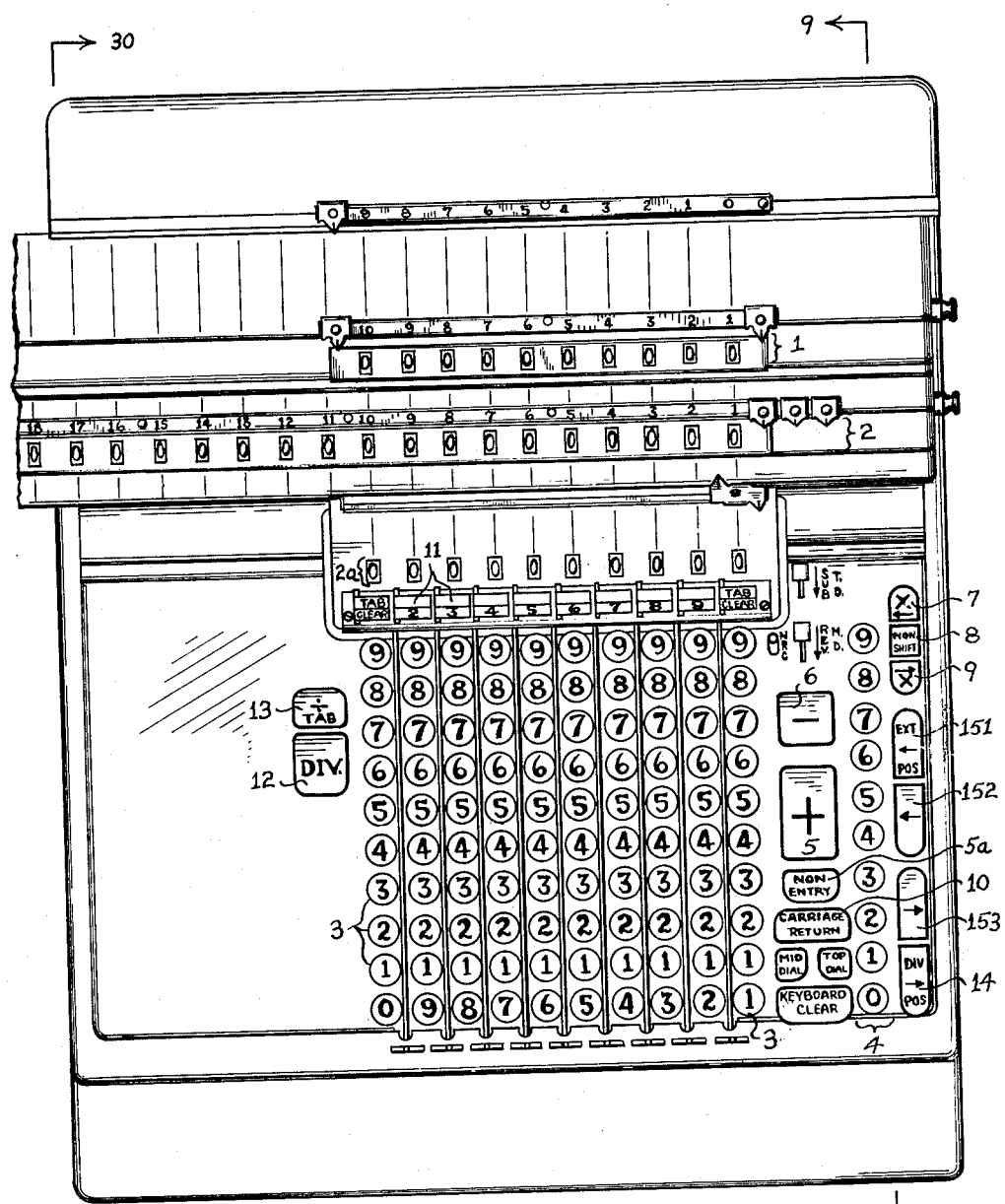
FIGURE 1 is a top face view of a calculating machine embodying the invention, the carriage being shown in fragment in its leftmost position.
Figure 13:
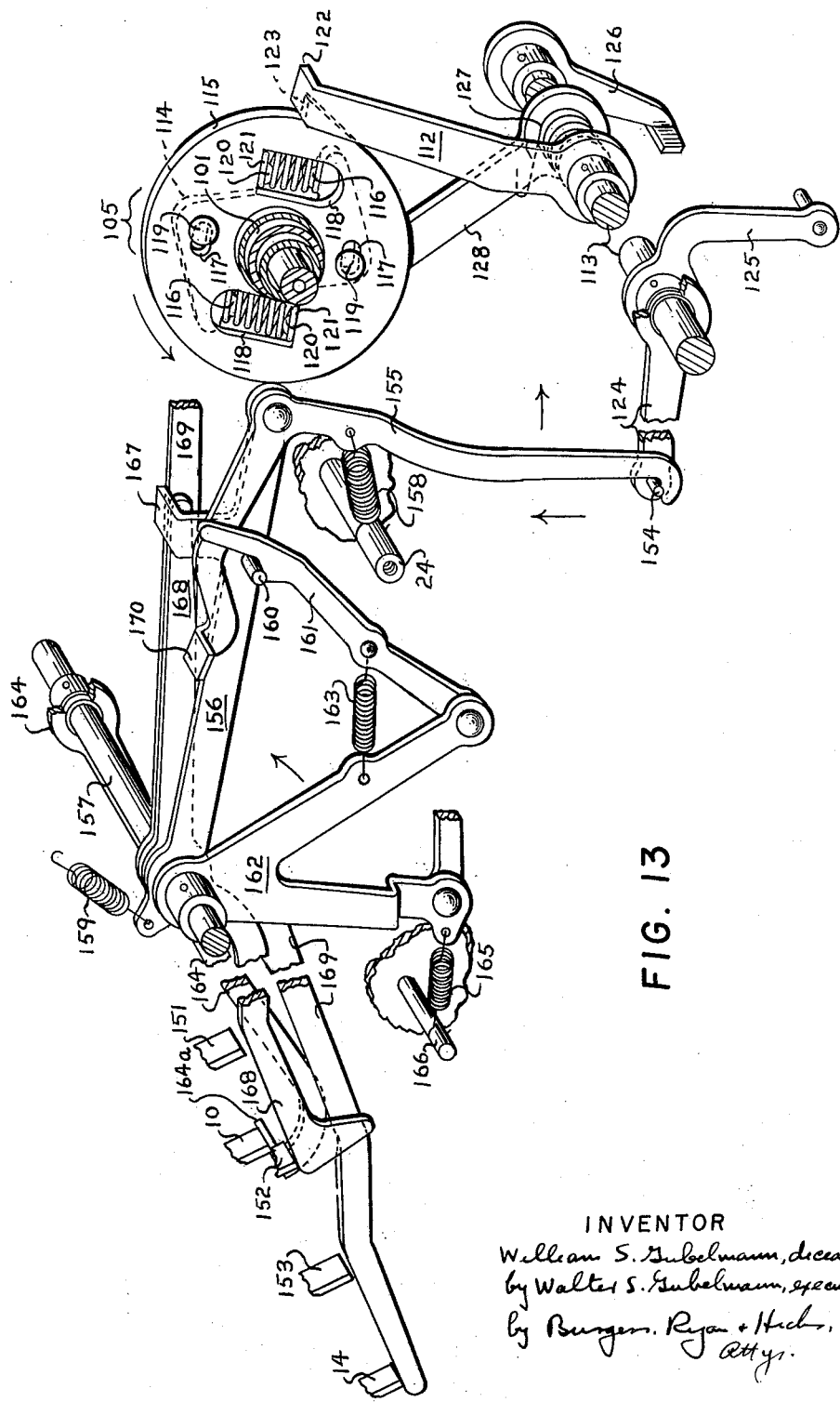
FIGURE 13 is a fragmentary perspective view illustrating the carriage shifting power unit stop-start means, several shift keys and means operable by the keys on the stop-start means for effecting carriage shift operations.
Figures 14, 15:
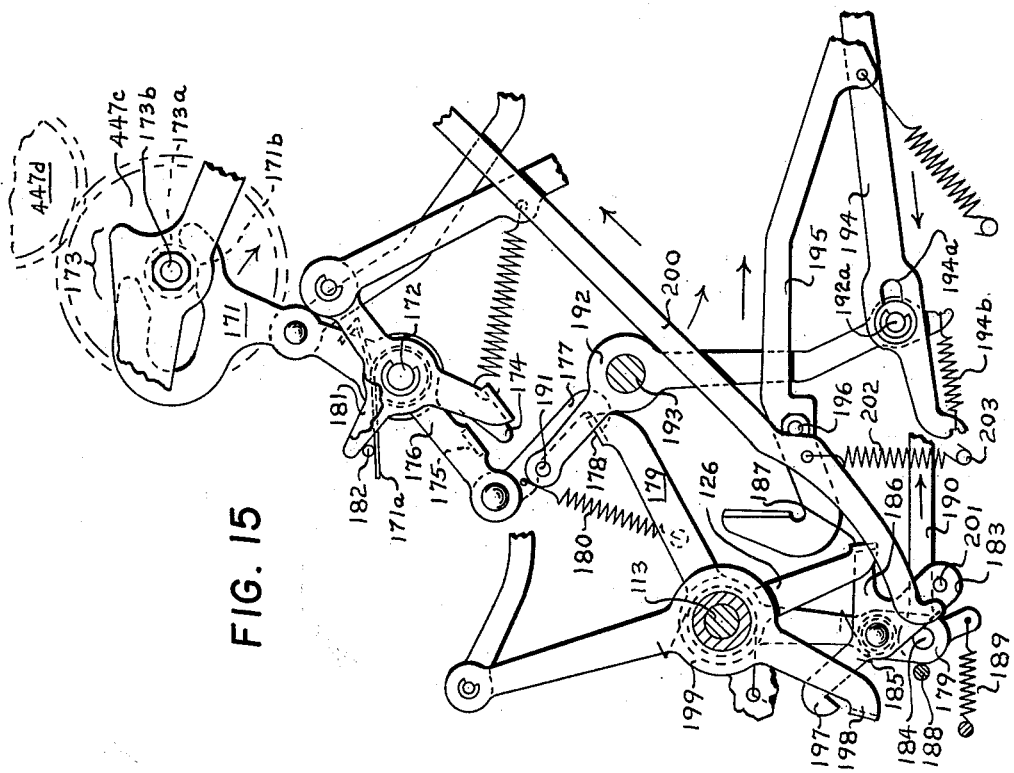
FIGURE 14 is a fragmentary partly sectioned perspective view showing principally the division power unit stop-start means and controls operable on the stop-start means for effecting operation of the division power unit, including the control responsive to a division key and another control operable by the carriage shifting power unit.
Figure 17:
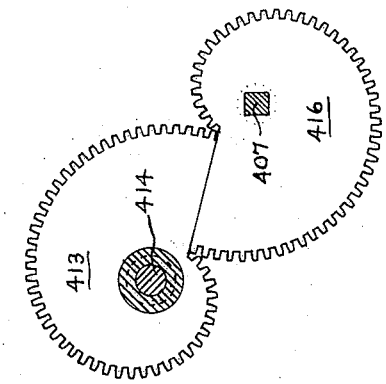
Figure 18:
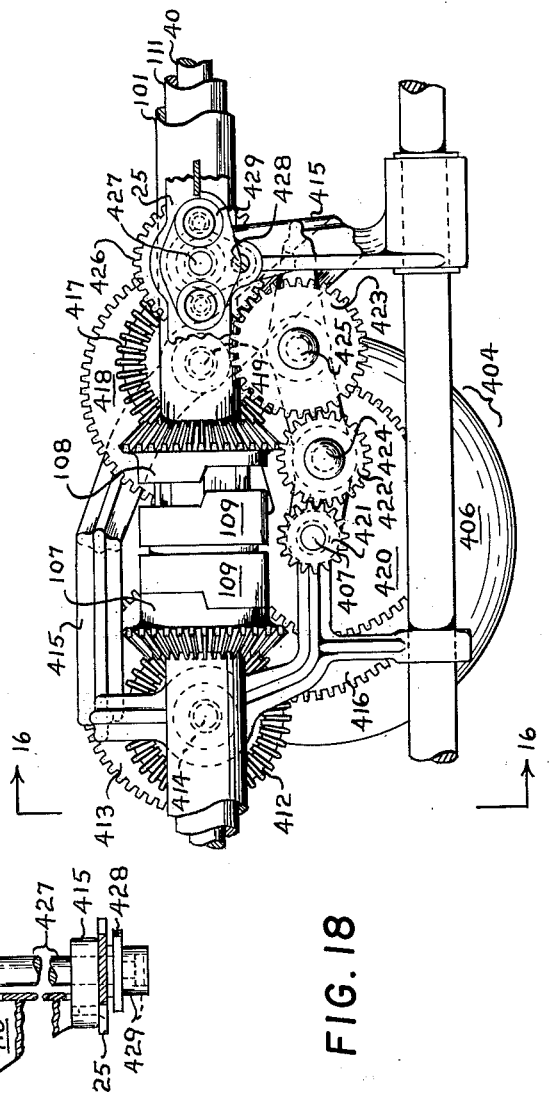
Figure 16:
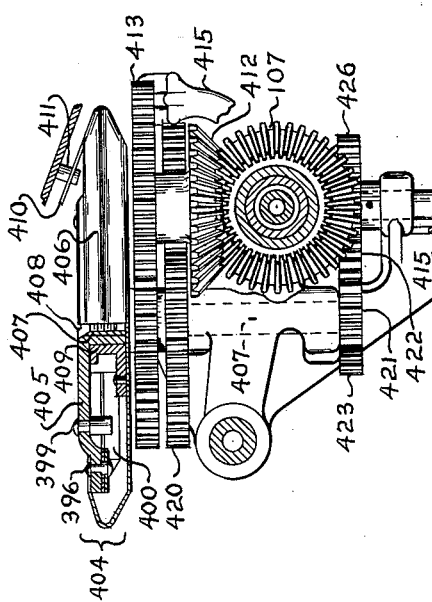
Figure 25:
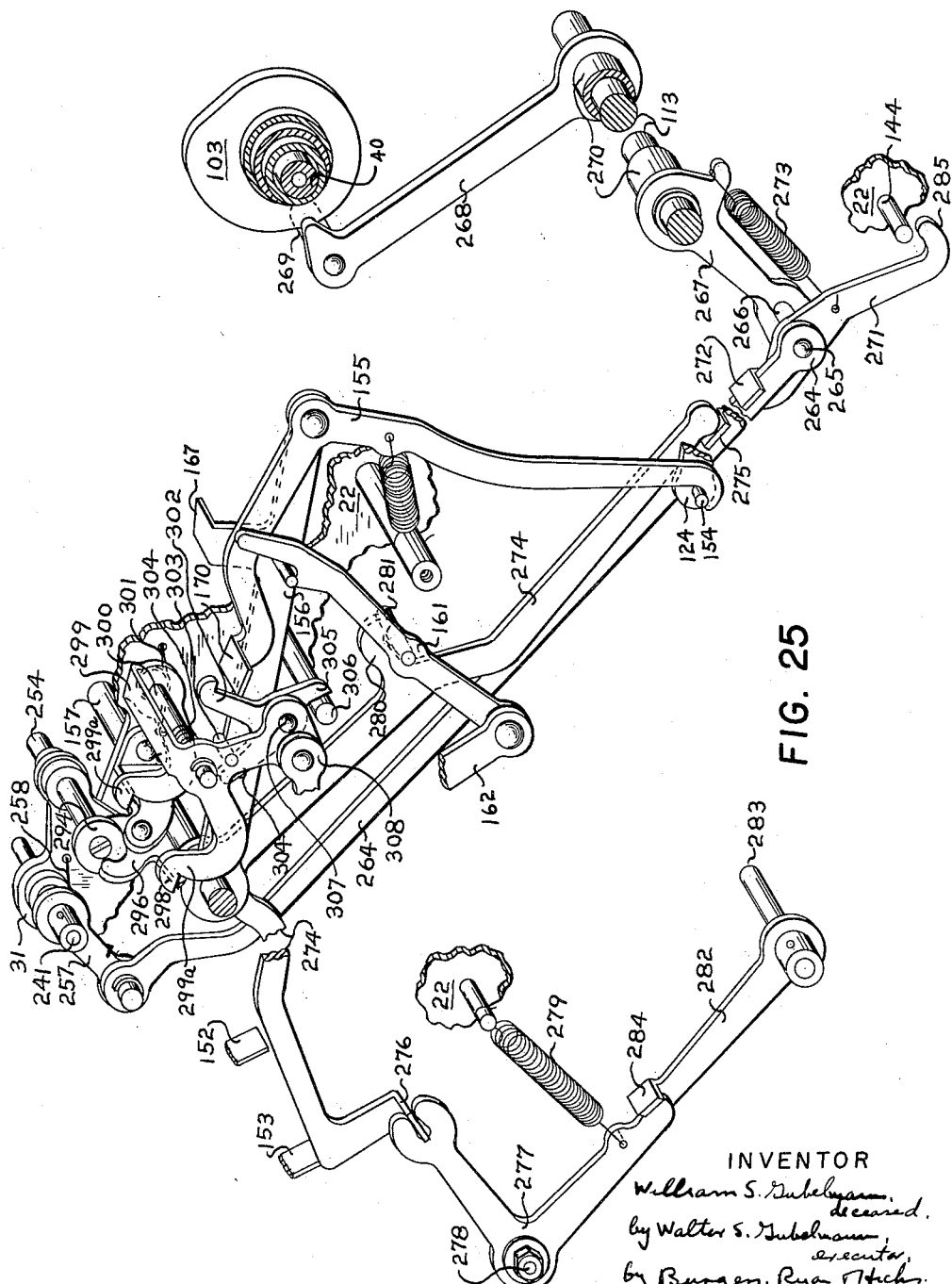
Figure 35:
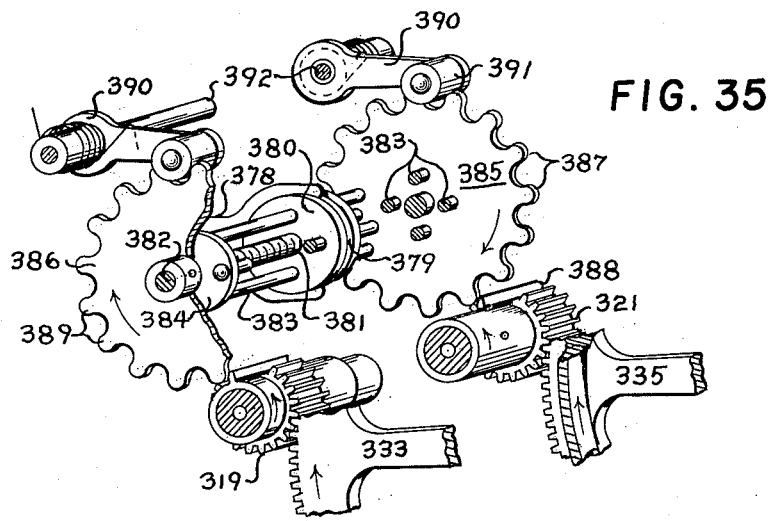
Figure 36:
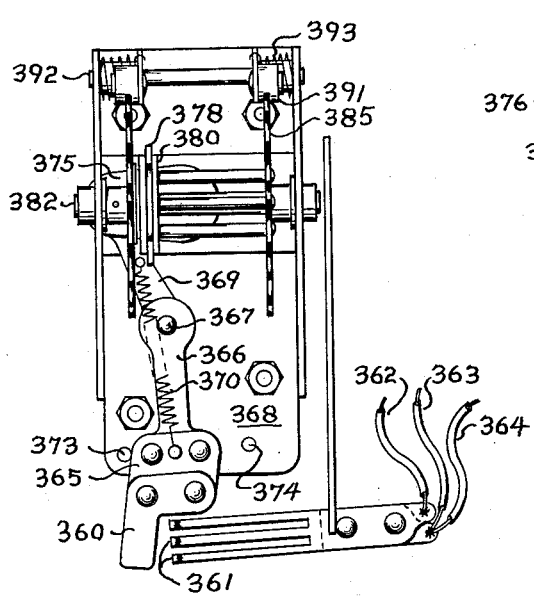
Figure 37:
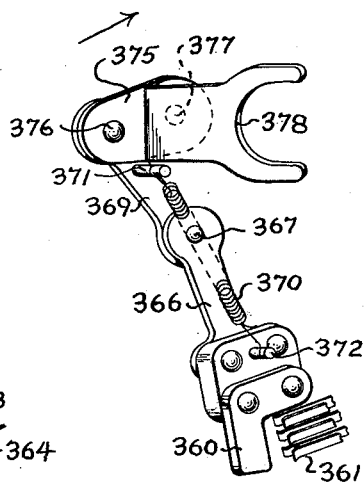

FIGURE 15 is a fragmentary left side elevation of control means operable on the carriage power stop-start means shown in FIGURE 13 for effecting carriage shift operations, including a control operable by the multiplying power unit when registration of a product is completed, another control operable by the multiplying power unit when the overdrafting amount in division is restored and the too large trial quotient value is "1," and still another control operable by the division power unit when the trial quotient value is "0," also a part of the division terminating control and the non-shift control;

FIGURE 16 is a fragmentary left side sectional view of the carriage shift mechanism taken substantially on plane 16—16 of FIGURE 18 and of the governor for controlling the rate of operation of the mechanism and carriage power unit;

FIGURE 17 is a sectional elevational illustration of one of two similar pairs of scroll gears of the carriage shift mechanism;

FIGURE 18 is a fragmentary front elevation illustrating the carriage shift mechanism and a part of the carriage power unit with which the mechanism is normally coupled for leftward shift operation;

FIGURE 19 is a fragmentary top plan view of the tabulating mechanism, including the selective tabulating keys and clearing keys therefor;

FIGURE 20 is a sectioned view of a compressible cylinder carried by the carriage for actuating the tabulating mechanism;

FIGURE 21 is a sectioned view of the cylinder in FIGURE 20 in its compressed state;

FIGURE 22 is a fragmentary right side elevation of the bail means for rendering the tabulating mechanism operable at a preselected order;

FIGURE 23 is a fragmentary sectional left side view taken substantially on plane 23—23 of FIGURE 19 showing the lowest or left-most order section of the tabulating mechanism for causing the carriage to stop at its right extreme position, and of the means for clearing a depressed tabulating key;

FIGURE 24 is a fragmentary sectional side elevational view showing an order of the tabulating mechanism intermediate the extreme orders, the view being taken substantially on plane 24—24 of FIGURE 19;

FIGURE 25 is a partly sectional fragmentary perspective illustration of means operable by several carriage shift keys and by the division tabulation key for causing the carriage power unit to render the tabulation mechanism operable by the carriage at a selected ordinal position, and of means operable by the tabulating mechanism on the carriage power unit arresting or stop-start means for stopping the carriage at the preselected position;

FIGURE 26 is a partly sectional fragmentary perspective view of means for preventing initiation of division operations when the carriage is stopped at other than an ordinal position and for preventing an untimely shift of the carriage during cycling of the division power unit, and of means for preventing an untimely shift of the carriage during cycling of the multiplying power unit;

FIGURE 27 is a right side elevation of an element of the mechanism for rendering the tabulation mechanism operable;

FIGURE 28 is a fragmentary perspective view of means for preventing initiation of multiplying operations when the carriage is stopped at other than an ordinal position and for preventing an untimely shift of the carriage during the initial phase of the multiplying power unit revolution;

FIGURE 29 is a front detail elevation of a rocker means actuatable by the tabulating mechanism, also shown in perspective in the upper portion of FIGURE 25;

FIGURE 30 is a sectional left side elevation taken substantially on plane 30—30 of FIGURE 1 and showing a spring motor for driving the main drive shaft also shown in FIGURE 6, means for rewinding the spring and an automatic control for starting and stopping rewinding operations;

FIGURE 31 is a front elevation as seen from the right of FIGURE 30 principally of the spring motor and the rewinding means shown in FIGURE 30;

FIGURE 32 is a sectioned front elevation of the spring motor taken on plane 32—32 of FIGURE 30, the view omitting the inner coil spring for clarity;

FIGURE 33 is a fragmentary perspective view of the rewinding gears and coupling means therebetween;

FIGURE 34 is a fragmentary perspective view of the gear train of the spring motor and rewinding means;

FIGURE 35 is a fragmentary sectioned perspective of part of the automatic rewinding control;

FIGURE 36 is a front elevation of the automatic rewinding control;

FIGURE 37 is a fragmentary perspective of some of the elements shown in FIGURE 36.

The specification may for convenience be divided into the following eight major topics:

(1) General Description
(2) Multiplying Power Unit and Stop Start Means
(3) Carriage Shifting Power Unit and Arresting Means
(4) Division Power Unit and Arresting Means
(5) Tabulation
(6) Driving Mechanism
(7) Governors
(8) Improperly Stopped Carriage Safeguards References in the specification to direction such as "forward," "rearward," "rightward," "leftward," etc., are with respect to the machine as viewed in FIGURE 1, unless otherwise specified.

This application is a division of my copending application, Serial No. 194,273, filed November 6, 1950, for a Calculating Machine, now issued Patent No. 2,969,177, filed November 6, 1950 and issued January 24, 1961, and retitled as for Partial Product Calculating Machine.

(1) *General Description*

The machine in which the present invention is embodied is disclosed in detail in the afore-mentioned parent application, Serial No. 194,273, filed November 6, 1950, now Patent No. 2,969,177, to which reference may be had for a complete disclosure not otherwise mentioned herein. A brief summary of the machine and its operations, however, is presented herewith in order to facilitate understanding of the invention and its interaction with various mechanisms of the machine.

The machine shown in FIG. 1 embodies predetermined partial product and quotient representations in a multiplying and a dividing mechanism respectively; a shiftable carriage which carries accumulator registers 1 and 2, with a carriage shifting mechanism; several banks of keys 3 for setting up factors in various computations; a bank of multiplier keys 4, each of which serves to initiate a multiplying cycle of operations; initiating keys for addition, subtraction and division computations, and for carriage shift; a tabulating mechanism, and an automatically powered motor, and also including three actuating units constantly urged rotatively by the motor for actuating the multiplying, dividing and shifting mechanisms. Hereinafter, each actuating unit is referred to respectively as the multiplying, dividing and carriage power or drive unit.

Results and factors of the various computations are indicated in ordinally disposed dials or number wheels of registers 1, 2 and 2a as follows: Register 1, carried by the carriage, can indicate the multiplier, quotient, or the number of items in addition or subtraction, as the case may be and, alternatively, the complement of any of the foregoing. Register 2, also carried by the carriage, can indicate the product, dividend, sum, difference, or such complements thereof as are desired. Stationary register 2a shows for easy reading a currently set up factor on keys 3. The numerals on the number wheels are visible through suitable apertures on the respective overlying cover plates.

This machine, commonly known as a "four rules calculator," performs the arithmetical calculations of addition, subtraction, multiplication and division automatically.

Multiplication is direct, as distinguished from repeated addition in that the machine multiplies in a manner closely analogous to the operational method used in mental computations. Representations of products for digits 0 to 9 times 1 to 9 are provided on multiplication plates which are selected and set-up respectively in accordance with the separate digits of the multiplicand and each multiplier digit. The partial products thus obtained are integrated into the final product. Depression of a key 3, value 1 to 9 in a bank selects the products of that value times the digits 1 to 9. Each multiplier key 4 for values 1 to 9 serves as an initiatory control for effecting operation of the computing or multiplying mechanism and exercises a control over the same for setting up the multiplicand digit selected multiplication element according to the value of the multiplier key, so that the pertinent partial product on each plate is at a sensing position. The multiplying or computing mechanism includes means for sensing and integrating the values of the set-up representations and entry means controlled thereby for operating registers 2 and 1 to indicate the product and multiplier respectively. A cycle of multiplying operations also includes the operation of automatically initiating an ordinal shift of the carriage. Depression of the "0" value key 4 initiates an ordinal shift of the carriage without first having to excite the computating mechanism.

Addition and subtraction calculations are performed by automatically treating the factors thereof as multiplicands and multiplying the factors by "1." Add key 5 and subtract key 6 are in effect "1" value multiplier keys, but the cycles of operations instituted thereby do not include the operation of automatically initiating a shift cycle. The product thus obtained of a subtrahend is registered subtractively by the dials of the register therefor. Selective means is also provided for effecting subtractive registration of other products.

Selectively operable keys 7, 8 and 9 are provided for controlling the direction of shift and non-shift of the carriage, as for multiplication. With key 7 in depressed position, the automatic ordinal shift of the carriage will be leftward, but with key 9 in depressed position instead, the ordinal shift of the carriage will be rightward, as indicated by the arrows on these keys. In each instance, the carriage will shift in the opposite direction to a preselected start position with the use of carriage return key 10. With key 8 in depressed position the automatically operated shift initiating means is normally disabled.

The tabulating mechanism is of the type which stops the carriage at an ordinal position by directly blocking operation of the carriage power unit. The tabulating mechanism is brought into operation each time the carriage shifts to either end position. A similar operation of the tabulating mechanism will also occur at an intermediate ordinal position only with the use of certain shift keys provided that preselection of that position is made by depression of an appropriate one of the tabulator keys 11, which are self lockable and are releasable upon depression of a "tab clear" key at either end.

Figure 1B:
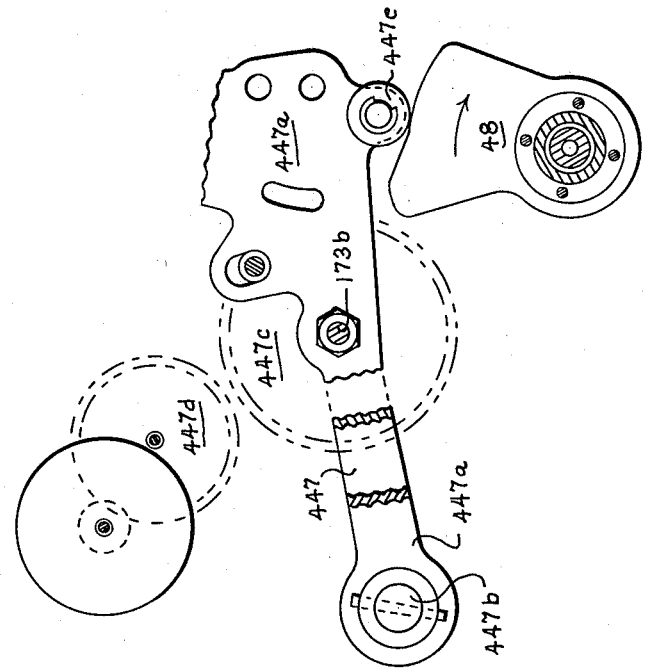
FIGURE 1b is a fragmentary right side view of the carrier bail for the entry mechanism of the main body, showing also one of the entry mechanism gears and an order of the carriage borne gears and dial.
Figure 1A:
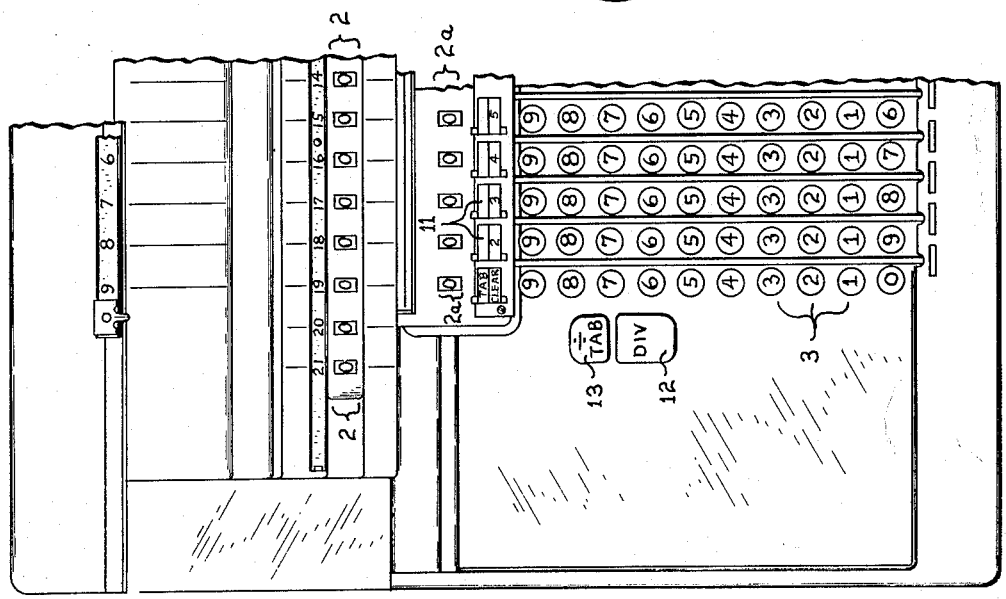
FIGURE 1a is a fragmentary top face view similar to that of FIGURE 1, but showing the carriage shifted all the way to the right.

Heretofore, division computations have been performed by repeated subtraction or logarithmic processes. In this machine, division is accomplished directly by structural elements in a manner closely analogous to the method corresponding to the well known mental procedure in "long division." The mechanism used for a calculation in division includes representations on plate elements of predetermined quotient values for dividends from 0 to 99 divided by divisors 1 to 9, means for selecting a plate element and setting up the same, and means for deriving the trial quotient value from the set up representation, and the dividing mechanism also makes use of the multiplying mechanism. This means that when a dividend has been set up in register 2 and a divisor has been set up in keys 3, upon actuation of a divide key 12 or 13, the machine automatically selects a quotient value in accordance with the highest order of the divisor and the highest order of the dividend in the first cycle of operations and the two highest orders of the dividend remainder in each successive cycle of operations. Each selected value is the "trial quotient" value which is then entered automatically into multiplication with the divisor, and the resulting product is subtracted from the dividend in register 2. Key 12 or 13 may be depressed only when the machine is properly set up for a division computation. The machine is prepared for such a computation as follows:

The carriage is shifted to its rightmost position, as illustrated in FIG. 1a, preferably by the depression of extreme shift key 14, FIG. 1. At this rightmost position of the carriage, FIG. 1a, the 19th dial of register 2 is then in alignment with the leftmost bank of keys 3 to receive a registration therefrom. The dividend is then set up in the multiplicand selecting mechanism by keys 3, preferably with the highest order of the dividend in the leftmost bank of keys 3. With the use of add key 5, FIG. 1, the dividend is registered in register 2, the highest order appearing in the 19th order numeral wheel, the lower of the two highest inboard order wheels. An inboard order numeral wheel or dial is one which is in engaging relation with the entry and carry mechanism of the main body of the machine. Non-entry key 5a (FIG. 1) is depressed simultaneously with add key 5 whereby registering of the item "1" in register 1 is blocked. The divisor is then set up in the multiplicand selecting mechanism by keys 3, with the highest order real digit, i.e., a digit other than "0," in the leftmost bank. In addition to making a selection of relative partial products, the depressed key 3 in the leftmost bank also effects selection of quotient representations in the division mechanism relative to the value of that key.

Depression of either division key is normally blocked by key lock means which are rendered ineffective only when both the carriage is in its rightmost position and a real digit key 3 is depressed in the leftmost bank.

The key lock mechanism also includes, among others, means for holding a cycling key in operated position until the final phase of the operations instituted thereby are completed, and for preventing operation of a cycling key while another cycling key is in operated position, and while a factor key 3 is partially depressed. Operation of either key 12 or 13 excites a mechanism which conditions the machine (without upsetting current setups that may be incongruous with requirements for division) for subtractive entry of products and for sequential operations of the division, multiplying and shifting mechanisms, the latter to shift the carriage leftward. The conditioning mechanism also initiates the first cycle of operations of the division power unit. With the use of key 13, the conditioning mechanism also renders the tabulating mechanism effective to cause termination of the division process upon registration of a predetermined number of quotient digits. First, however, the tabulating mechanism must be set by depression of that tabulator key 11 which corresponds with the number of digits desired. With the use of key 12, whether or not a tabulator key selection is made, or with the use of key 13 when a selection is not made, the tabulating mechanism will cause termination of the process only when the ordinal capacity of the machine is reached.

In algebraic division processes the problem is "solved" whenever the dividend is eliminated, i.e., reduced to "0." Sensing means, one for each order dial of register 2, are all movable together and movement is obstructed when a dial is displaced from "0" position, indicating a remainder. Accordingly, turning of all the dials to "0" position enables the sensing means to move, whereupon the sensing means effects termination of the division process automatically, there being no remainder and no reason for continuing the operations.

Both the eliminated dividend sensing means and the tabulating device motivate a mechanism which terminates the division process by preventing the sequential re-initiation of the division power unit after the instant final true quotient digit is registered.

Selection of a trial quotient value is made from representations of quotient values provided for dividend numbers ranging from 0 to 99 divided by divisor digits 1 to 9, both inclusive. The trial quotient first obtained may be an "over-estimation." In that case the mechanism automatically reduces the trial quotient by "1" and makes one or more further attempts to obtain the true quotient. When the true quotient, a single digit, is so obtained, it is registered in register 1. Failures to obtain the true quotient are evidenced by an over-draft from the dividend, which is automatically cancelled out by adding back into register 2 the amount subtracted therefrom, i.e., the product of the divisior times the trial quotient which proved too large. In the majority of instances the trial quotient proves to be the true quotient. The need for repeating more than once the attempt to obtain the true quotient integer is relatively infrequent. "Under-estimation," i.e., selection of a too small quotient integer is not possible, due to the positive stop arrangements provided.

The preferred method of carrying out a division process in this machine is as follows: The value of the dividend digits in the two highest inboard orders of register 2, FIG. 1a, the 20th and 19th is sensed. In the initial cycle, the value in the 20th order wheel is "0" and in the 19th wheel the value is that of the highest order integer of the dividend. In accordance with the sensed dividend value, the pertinent quotient value representation on the divisor selected element is set-up. Then the set-up quotient representation is sensed and concurrently the multiplier controls in the computing mechanism are adjusted automatically for that trial quotient value. Next, operation of the multiplying power unit is instituted automatically, whereby the multiplying mechanism is operated to obtain the product of the divisor factor (the multiplicand) times the trial quotient digit (the multiplier), to subtract that product from the dividend, and to enter the trial quotient in the first inboard order of register 1, the 10th or leftmost order in the initial phase of the division process.

When subtraction of the product does not result in an overdraft, as would be indicated on register 2, a cycle of operations of the carriage power unit is instituted automatically for an ordinal shift of the carriage leftward one step. In the final phase of the shift cycle, operation of the division power unit is initiated again, this time automatically, except, however, when the carriage has been shifted to its leftmost position, or to a preselected ordinal position, or whenever the dividend has been eliminated, showing that a solution has been reached. In the event an overdraft occurs, the overdrafting amount and the too large quotient digit entries are withdrawn from the respective registers 1 and 2. At the same time the dividing mechanism automatically reduces the value of the too large quotient digit by "1" and adjusts the multiplier controls accordingly. Operation of the multiplying power unit is re-initiated automatically, this time for obtaining the product of the divisor factor times the reduced trial quotient value and reducing the dividend by that product. If the value of a set up trial quotient or of a reduced trial quotient is "0," operation of the carriage power unit is instituted for shifting the carriage leftward one step without first having to excite the multiplying power unit and mechanisms.

Figure 2:
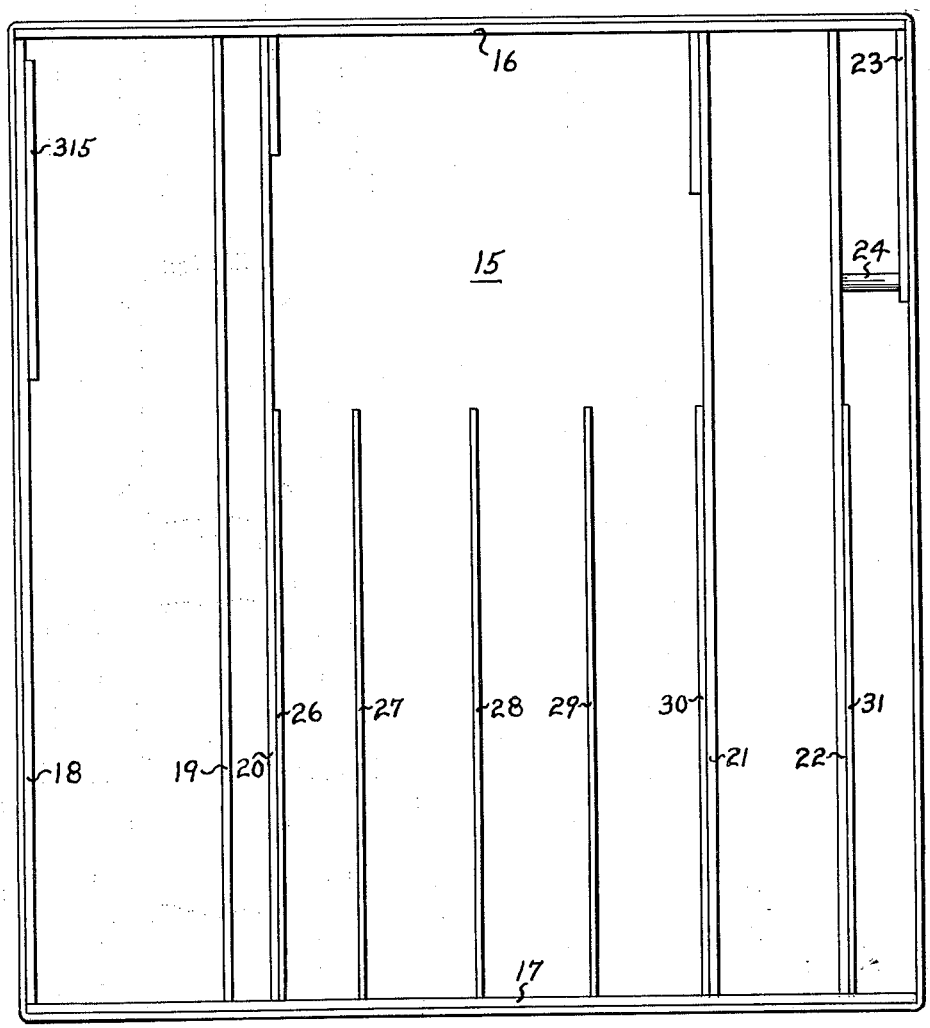
FIGURE 2 is a top plan view of the machine frame.
Figure 5:
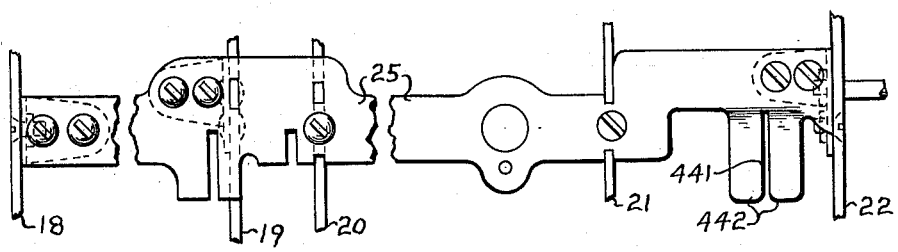
FIGURE 5 is a fragmentary, partly broken out detailed top view of a transverse frame member.

The frame of the machine embodying the invention includes base plate 15 (FIG. 2) to which rear and front plates 16 and 17 are fastened respectively, and plates 18–22 which extend parallelly between the front and rear plates and are secured thereto and to base 15. The rightmost plate 23 is a short plate secured to the rear and base plates, and the upper forward end of plate 23 is secured to plate 22 by means of rod 24. A cross member 25 (FIG. 5) is secured to the upper faces of plates 18–22, inclusive, for making the frame structure more rigid.

Companion plates 26–31 (FIG. 2) are secured to each other parallelly as by shaft sections (not illustrated), the ends of which are of reduced diameter and are threaded for securing one section to the other and clamping the respective plate therebetween. The unit thus formed is fastened removably to plates 20 and 22, as by bolts which are not shown. This unit supports mechanism actuated by various keys. Another frame unit which supports the keys and the locking mechanisms therefor is formed of the following plates: top 32, FIG. 9, bottom 33, front 34, rear 35, and suitable side plates 36 and 37 which are not shown. This key board unit may be removably secured to companion plates 26–31 (FIG. 2) in any well known manner.

(2) Multiplying Power Unit and Stop-Start Means

Multiplying drive unit 38, FIG. 6, is formed of a sleeve 39 rotatably mounted on shaft 40, journaled on the machine frame, a drive gear 41 and a speed responsive governor unit 42 secured respectively to the left and right ends of the sleeve, and cams 43–50, inclusive, mounted on the sleeve between the gear and governor with suitable annular spacers 51 therebetween. Components of governor 42, drive gear 41 and the interposed cams and spacers are secured together as a unit by rod means 52.

The unit is constantly urged to rotate, as will be described, by means of its gear 41. Rotation of the unit is clockwise, as when viewing its cam 45 in FIG. 9 and indicated by the arrow thereat. In a 360-degree revolution, the several cams of the multiplying power unit operate the multiplying mechanisms, and the rate of such rotation is controlled by the governor, which will be described later. Cam 43 cooperating with detent 53 of the stop-start mechanism serves to hold the multiplying power unit in its stop-start position.

Detent 53 is pivotally mounted on the depending arm of bellcrank 54 fulcrumed at pivot 55 on bracket 56 which is fixed to the main frame member 16. The clockwise rotative force of cam 43 presses detent 53 and bellcrank 54 rearwardly where the rear extension 57 of the bellcrank is stopped by buffer element 58 of suitable shock absorbing material supported on fixed bracket 56. The buffer element may be adjusted relative the extension by suitable spacers between the buffer element and the bracket. A lever 59 is pivoted on the bracket 56 so as to extend rearwardly near extension 57. The lever carries a roller 60 which overlies the extension. A compression spring 61 is supported on lever 59 and is fastened to lateral lug 62 on bracket 56 by an adjustable screw and lock-nut 63. The inclined cam upper profile of bellcrank extension 57 presented to roller 60 is such that spring 61 rocks bellcrank 54 clockwise against fixed lateral lug 64 on bracket 56 when detent 53 is disengaged from cam 43. Spring 61 exerts spreading bias between lug 62 and the roller carrying end of lever 59, and the screw and lock nut is provided for adjusting the tension of spring 61. Thus detent 53 is moved sufficiently forwardly so as to be resettable in the path of cam 43 at a position in advance of the stop-start position of the cam. Then on re-engagement of cam 43 and detent 53, bellcrank 54 is rocked rearwardly whereupon the inclined cam profile of its extension 57 causes the lever 59 to move counter-clockwise to recompress the spring 61. Thus the spring retards the power unit with increasing resistance before extension 57 contacts buffer 58, considerably reducing the stopping shock therebetween.

Spring 65, fastened to detent 53 and to the forwardly extending arm of bellcrank 54, tends to rock the detent clockwise. The detent contact surface of the cam 43 and the cam contact surface of detent 53 are mutually inclined so that in response to the urgence of springs 65 and 61 and the clockwise rotative force of the cam, the detent moves upwardly when it is liberated. Normally detent 53 is held in engagement with cam 43 by member 66 which is pivoted on bracket 56. Member 66 extends forwardly and has a lateral lug 67 overlying detent 53 and further forward it has another lug 68 which is latched by a rockable latch 69 so as to prevent counter-clockwise movement of the lever by the detent. Disengagement of latch 69 from lever 66 permits the detent to disengage from the cam. The upward swing of lever 66 is limited by lateral lug 70 on bellcrank 71 which is adjacent to the lever. Both 71 and 66 have a common pivot on bracket 56. Spring 72 fastened to bellcrank 71 and member 66 urges the bellcrank clockwise so that roller 73 on its depending arm is constantly held in contact with cam 45. The profile of cam 45 is such that during the initial phase of its clockwise revolution it rocks the bellcrank 71 counter-clockwise sufficiently to effect re-engagement of member 66 with latch 69. Thereafter the bellcrank 71 is returned to its normal position, as shown. In being returned to latched position, member 66 will, of course, return detent 53 into the path of the contact surface on cam 43. Member 66, as will be described later, is prevented from elevating sufficiently to allow detent 53 to disengage from cam 43 when the carriage is not standing at an ordinal position.

Latch 69 is pivotally mounted on shaft 73a which is fixed on the machine frame. The latch is interposed between bellcrank 74 and lever 75 which are rockably mounted on the shaft 73a. Spring 76 fastened to member 77 (to be described presently) and to bellcrank 74, urges the bellcrank counter-clockwise against bent over portion of a stop member 78 which is secured to a frame member not shown here. The depending arm of latch 69 stands in the path of clockwise movement of lateral lug 80 on the depending arm of bellcrank 74, and torsion spring 79, fastened to bellcrank 74 and latch 69 holds the latch in contact with lug 80. Accordingly, clockwise movement of bellcrank 74 will disengage latch 69 from the lug 68 of member 66 thereby to trigger the stop-start mechanism. Such actuation of bellcrank 74 is performed by the clockwise stroke of lever 75 in the path of which the lug 80 stands, and by the forward stroke of hook 81 latched onto the lug.

The free end of lever 75 has connected thereto one end of link 82 which is part of the linkage train actuated automatically by controls in the dividing mechanism, as described in the afore-mentioned parent patent application. Returning to FIG. 10, 4C represents one such control in the dividing mechanism (to be described), which is operable by the dividing power unit 83, through linkage means represented generally by 83a, when a quotient other than "0" is obtained, and 5C represents another of such controls which is operable by the multiplying power unit 38 through 38a when the reduced trial quotient is greater than "1." Both controls are normally disabled. ODS represents the overdraft sensing means responsive to an overdraft for rendering control 5C operable, and QV represents the quotient value means which renders control 4C operable when a trial quotient other than "0" is obtained and which renders control 5C effective when the reduced trial quotient is greater than "1."

Hook 81 (FIG. 9) is stroked forwardly in response to depression of a multiplier key 4 for values 1–9, add key 5 (FIG. 1) and subtract key 6. Hook 81 (FIG. 9) is pivotally mounted on the depending arm of member 77 which is secured to one end of a sleeve 84 rotatably mounted on shaft 85 fixed on the machine frame. The other end of the sleeve has member 86 secured thereto. The unit formed of 86, 84 and 77 is rocked clockwise by the just mentioned computation keys, as will be described, for pulling the hook 81 forwardly, thereby rocking latch 69 clockwise to initiate multiplying operations. Hook 81 is held in its operated position until the depressed cycling key is returned. Then spring 76 returns the unit and the hook to their illustrated normal positions. Rear extremity 87 of hook 81 overlies lug 67 on member 66 so that the hook 81 disengages from lug 80 of bellcrank 74 when member 66 is elevated as described. Thus bellcrank 74 and latch 69 are liberated for their return stroke before member 66 is lowered to relatch with 69. The profile of latch 69 cooperates with lug 68 on its downward movement to oscillate the latch 69 to effect relatching. At such times torsion spring 79 yields, whereby bellcrank 74 remains in normal position with hook 81 resting on lug 80. Upon release of the depressed cycling key, the hook 81 moves rearwardly, that is, to the right as seen in FIG. 9, to re-engage with the lug 80. Each multiplier key 4 is held in its up position by a spring as shown. The shanks of the keys for values 1–9 overlie a vane 88 which is formed with bent over ends or flanges 89 and 90 that extend laterally to where they are pivotally mounted on suitable lateral extensions on frame member 31. A torsion spring 91 is fastened to end portion 89 and to the stud 89a, forming the pivot therefor, for urging the vane upwardly against the key shanks. Depression of anyone of these keys will rock the vane downwardly. Rearward of vane 88, a lever 92 is pivotally mounted on stud 93. Clockwise movement of the lever 92 is limited as by a stud 94. Both studs 93 and 94 are on fixed frame member 31. The forward arm of lever 92 is formed with a bentover tab 92a which stands in the path of extension 95 on vane 88, and the rear arm of lever 92 underlies member 86 of the aforedescribed rockable unit 86, 84, 77. The rockable unit is held in contact with lever 92 by the tension of spring 76. It can readily be seen that upon downward movement of vane 88 on depression of a key, vane extension 95 rocks the lever 92 counter-clockwise thereby to rock the unit 86, 84, 77 on shaft 85 clockwise. Such actuation of the unit effects triggering of the stop-start mechanism as described.

Figure 12:
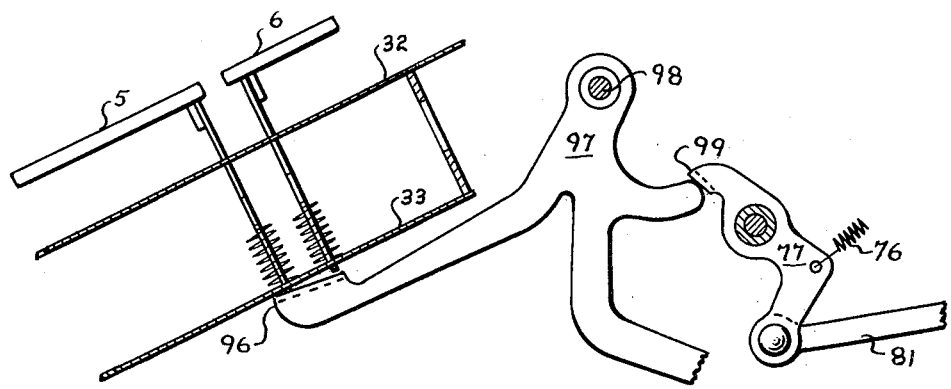
FIGURE 12 is a fragmentary right side view of the add and subtract keys and means operable thereby for triggering the multiplying power unit stop-start means.

Add key 5 (FIG. 12) and subtract key 6 are spring biased so as to be normally held in their "up" positions as shown. The depending extremities of the key shanks overlie lateral lug 96 on the forward arm of lever 97 which is fulcrumed on shaft 98 fixed on the machine frame. Depression of either key 5 or 6 will rock lever 97 counter-clockwise. The rearward arm of the lever underlies lateral lug 99 on member 77 so as to rock the unit 86, 84, 77 (FIG. 9) clockwise, thereby to trigger the stop-start mechanism. Spring 76 which urges this unit counter-clockwise also serves to return lever 97 clockwise with its lug 96 against the shanks of keys 5 and 6, as shown in FIG. 12.

(3) *Carriage Power Unit and Arresting Means*

Carriage power unit 100 (FIG. 6) comprises sleeve 101 with cams 102, 103 and 104, arrester or stop-start unit 105 and drive gear 106 secured thereto, and with beveled left traverse drive gear 107 and beveled right traverse drive gear 108 rotatably mounted thereon. Change direction member 109 is mounted on splines 110 on the sleeve for rotation therewith and is slidable thereon for coupling with either one or the other of gears 107 and 108. Sleeve 101 is rotatably supported by sleeve 111 which is rotatably mounted on journaled shaft 40. Unit 100, as will be described, is constantly urged to rotate counter-clockwise, as when viewing its arrester unit 105 in FIG. 13, but such rotation of unit 100 is normally blocked by its arrester unit 105 being held by arrester lever 112 which is secured to shaft 113 journaled on the machine frame.

Arrester unit 105 comprises members 114 and 115 (FIGURES 6 and 13). Member 114 is secured to sleeve 101 for rotation therewith and is formed with equiangularly spaced ears 116, two being shown by way of an example. The adjacent rockable member 115 (FIG. 13) is mounted coaxially with 114 and is provided with equiangularly spaced concentric lost motion slots 117, and with equiangularly spaced elongated openings 118, one for each of the ears 116. Equiangularly spaced stubs 119 on member 114 extend through slots 117 to limit angular movement of parts 114, 115 with respect to each other. The studs are also formed so as to prevent lateral displacement of the disc 115. One end of each opening 118 is adjacent an ear 116 of member 114, and the configuration at the opposite end of each opening forms an ear 120. An expansion spring 121 is inserted in each opening 118 and is fastened on the opposingly situated ears 120 and 116. The springs 121 constantly tend to turn disc 115 and member 114 oppositely of each other to normal position as limited by the studs 119 contacting the faces about the clockwise ends of the slots 117. In order to initiate a shift operation it is required only to swing lever 112 clockwise so as to disengage its lateral lug 122 from nib 123 of member 115 which the lug normally overlies, allowing member 115 to turn. To stop a shift operation at an ordinal position of the carriage, it is required only to return lever 112 counter-clockwise so that its lug 122 rides the periphery of disc 115 to intercept the nib 123. When disc 115 is stopped, member 114 may continue its counter-clockwise rotation a little further due to its lost motion connection with the disc. At such times springs 121 compress, thereby to cushion the stopping of the constantly urged power unit 100. The distorted compressed springs then return to their original shape, turning the power unit to its stop-start position with each stud 119 against the clockwise end of its related slot 117.

As seen in FIGURE 13, three levers, 124, 125 and 126, are secured to journaled shaft 113 to turn therewith, for effecting initiation of shift operations. Lever 126 is operated by automatic means and levers 124 and 125 are operated by manual means. Immediately upon release of the operated one of the levers, the unit formed of levers 124, 125, 126, shaft 113 and arrester lever 112 is returned to the initial or arresting position of lever 112 (FIG. 13) by torsion spring 127, fastened to 112 and to cam follower 128 (FIG. 14) which is pivotally mounted on shaft 113. Spring 127 constantly tends to swing arrester lever 112 clockwise so that its lug 122 is urged against the periphery of disc 115, and tends to swing follower 128 counter-clockwise so that the roller 129 mounted thereon rides the periphery of cam 104 of the carriage power unit. Cam 104 will be described and explained further in connection with sequential operations required in division.

Referring to FIG. 18 it will be noted that each end of the change direction member 109 has a single-step face, and that the adjacent faces of the bevel gears 107 and 108 are matingly formed to engage the step and receive the respective ends of the member 109 for positive drive coupling therewith. Member 109, which is normally engaged with gear 107, is shiftable to engage with either gear 107 or 108 by manually or automatically operated means. During such shifting, member 109 is in partial coupled relation with one gear before it is fully uncoupled from the other gear. In other words, the shift member 109 is so constructed as to operate to transfer its coupled relation from one to the other of the two gears 107 and 108 without losing the correspondence between the position of the carriage and the angular position of member 109. The spacing between the gears 107 and 108 is such that lateral movement of member 109 to couple with one gear or the other is possible only when the elevation of the (respective adjacent) stepped face on the coupling member 109 does not oppose the elevation of the matching stepped face on the respective gear, as in the illustration. The gear coupled with member 109 rotates with the carriage power unit, and the other gear rotates freely in a direction opposite to that in which it rotates when engaged. For each 360-degree revolution of coupled gear 107 or gear 108 the traversing mechanism is operated to move the carriage one ordinal step leftward or rightward respectively. In the stop-start position of the carriage power unit, the carriage is at an ordinal position.

Figure 11:
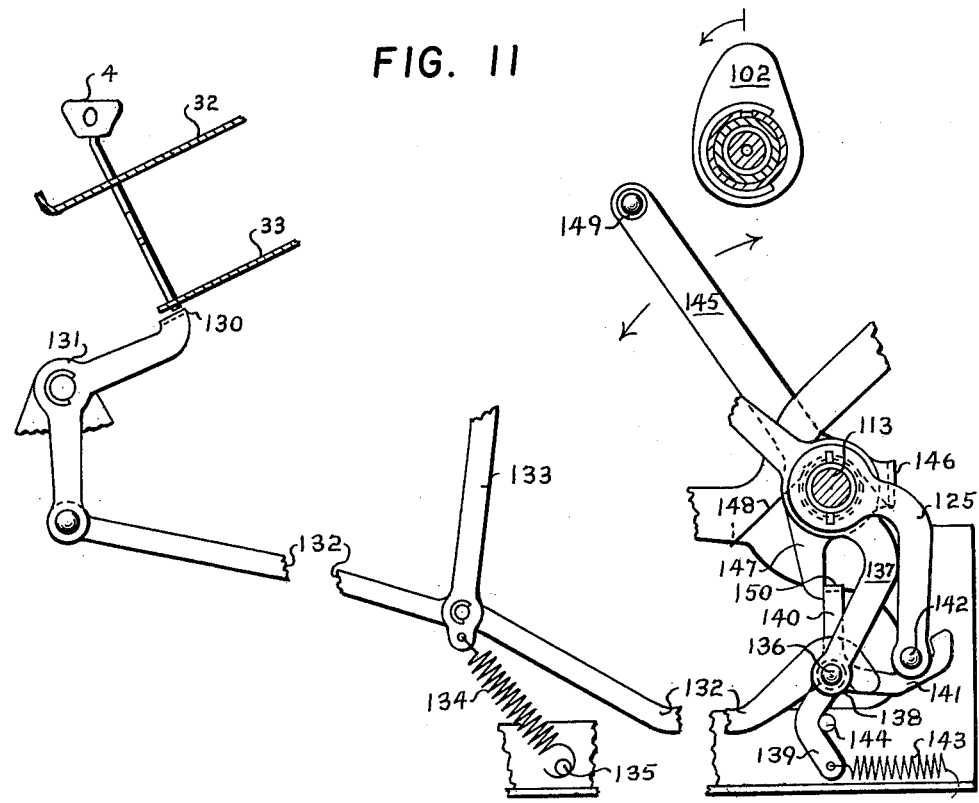
FIGURE 11 is a fragmentary right side elevation of the single step shift control for the carriage power unit stop-start means, the "0" multiplier key and the means operable thereby for triggering the arresting means and rendering the control effective.

The shank of zero multiplier key 4 (FIG. 11) overlies lateral extension 130 of bellcrank 131 pivotally mounted on the machine frame. A link 132 is connected to the depending arm of the bellcrank. Depression of the key rocks bellcrank 131 clockwise to stroke link 132 forwardly. Rearward in the machine, link 132 is pivotally connected to the depending end of link 133 of the non-shift key mechanism. Spring 134, fastened to the link 133 and to stud 135 on the machine frame so as to normally hold the connected links 133 and 132 in normal downward and rearward positions, as shown. The rearward end of link 132 is formed with a downwardly facing notch to embrace stud 136 on member 137 for rocking the member 137 clockwise. Member 137 is fulcrumed on shaft 113. Since, as will be described presently, the clockwise actuation of member 137 initiates operation of the carriage power unit, it is obvious that disengagement of link 132 from stud 136 would render the forward stroke of the link ineffective for initiating a shift operation. Accordingly, link 132 is elevated by link 133 in response to operation of the non-shift key (described in the parent case), thereby to disengage the link 132 from stud 136.

Bellcrank 138, fulcrumed on stud 136, is formed with a depending arm 139, upright arm 140 and rearwardly extending hook-arm 141 which underlies stud 142 on the lever 125. Clockwise actuation of member 137 carries the bellcrank forwardly and stud 142 stands in the path of forward movement of the hook formed on the free end of hook-arm 141. Thus lever 125 is rocked clockwise to effect initiation of a shift operation. Spring 143, fastened to the arm 139 and the machine frame, urges the bellcrank 138 counter-clockwise to normal position where its arm 139 is against stud 144 on the machine frame. At times when member 137 is swung clockwise and the arm 139 moves away from the stud 144, or when link 132 is elevated by member 133 and is thereby disengaged from stud 136, counter-clockwise movement of bellcrank 138 is prevented by its arm 141 which is in contact with stud 142.

It is desirable and customary to limit a zero key initiated shift operation to a single step shift of the carriage even though the key may be held in operated position indefinitely. Accordingly, means is provided to automatically disengage arm 141 from stud 142 in time to permit the unit formed with lever 125 (FIG. 13) to return counter-clockwise to normal position for arresting the carriage power unit at the completion of a 360-degree revolution. Referring to FIG. 11 again, it will be noted that lost motion is provided by spacing between the stud 142 and the hook formation on arm 141. During the time that the hook moves forwardly to engage the stud 142, the just mentioned automatic disengaging means is rendered operable. Follower arm 145, lateral member 146 and finger 147 are integral, forming a bail which is pivotally mounted on shaft 113. This bail is urged counter-clockwise by torsion spring 148 fastened to 146 and the machine frame. In normal position of the bail, roller 149 on the free end of arm 145 is out of the path of cam 102 of the carriage power unit, and bail finger 147 is in contact with lateral lug 150 on bellcrank arm 140, but without rotating the spring restrained bellcrank 138 clockwise. In its forward stroke, bellcrank 138 turns the bail 145, 146, 147 clockwise so as to move roller 149 against the minor radius periphery of cam 102, at about the time lever 125 is rocked clockwise sufficiently to effect initiation of a shift operation. Then, early in the counter-clockwise revolution of cam 102, its major radius periphery rocks the bail counterclockwise to rock bellcrank 138 clockwise sufficiently to disengage its arm 141 from stud 142. The spring tensioned arrester unit 112, 124, 125, 126 (FIG. 13) then returns to its arresting position to stop the carriage power unit at the completion of an ordinal shift of the carriage.

Referring to FIG. 1, keys 10, 151–153 and 14 are provided for initiating various carriage shift operations. Of these keys, 10, 151 and 14 are locked in operated position by suitable latching means (described in the parent application) until the final phase of the operation for the shift to that ordinal position at which the carriage is to stop. No means are provided for locking keys 152 and 153 in operated position. In addition to initiating a shift operation, each key 10, 152 and 153 renders the tabulation mechanism effective for stopping shift operations when the carriage reaches a preselected position between its current position and the extreme position toward which the shift is directed. Preselection is made by depressing that tabulator key 11 which corresponds with the ordinal position at which the carriage is to stop.

With carriage return key 10 the carriage is returned to the preselected position such as a start position in multiplication. If such a position is not preselected, the tabulation mechanism will automatically cause termination of the operations when the carriage reaches the extreme position. With left key 152 or right key 153 the shift operation will end at the completion of the cycle in which the operated key is returned. If, however, either of these keys is held in operated position indefinitely, the tabulation mechanism will terminate the operations when the carriage reaches a preselected position or, if preselection has not been made, when the carriage reaches the extreme position. Left and right extreme keys 151 and 14, respectively, do not render the tabulation mechanism effective for ending the shift operation at an intermediate preselected position. At such times, however, the tabulation mechanism is effective to terminate shift operations only when the carriage shifts to the respective extreme position.

In response to depression of a shift key, shaft 113 (FIG. 13) is turned clockwise by means of lever 124 to initiate shift operations. The forward end of the lever carries a stud 154 which is normally engaged by a hook formed on the depending end of bellcrank 155 so that elevation of the bellcrank as by member 156 will rock the lever 124 clockwise. Bellcrank 155 is fulcrumed on the rearward end of member 156 which is pivotally mounted on shaft 157, journaled on the machine frame. Spring 158, fastened to bellcrank 155 and to fixed frame rod 24, tends to swing the bellcrank clockwise and hold it in engagement with stud 154. A spring 159 is fastened to member 156 and to the machine frame (not illustrated) for urging member 156 clockwise to its rest position, as shown. Member 156 carries a stud 160 which is normally latched by pawl 161 for elevating the member 156. Pawl 161 is pivoted on the free end of member 162 depended from journaled shaft 157 and secured thereto for movement with the shaft. Pawl 161 is normally held in engagement with stud 160 by spring 163 which is fastened to the pawl and to member 162. A forwardly extending lever 164, secured to and turnable with shaft 157, is formed on its free end with a lateral lug 164a which underlies the shank of carriage return key 10. The unit formed of elements 164, 157 and 162 is held in normal position, against the shank of key 10 by spring 165 fastened to member 162 and to a stud 166 on the machine frame. Depression of the key rocks the unit 164, 157, 162 counterclockwise whereby pawl 161 elevates the member 156. Pawl 161 is disengageable from member 156, as in response to operation of the aforementioned Non-Shift key 8, as described in the parent application, whereupon the carriage return key 10 is ineffective to initiate shift operations.

For elevation by the other shift keys, member 156, as seen in FIG. 13, is provided with a lateral lug 167 which overlies the rearward arms of key operated levers 168 and 169, both of which are pivotally mounted on shaft 157. In this manner member 156 is also supported when in its rest position. The forward arms of levers 168 and 169 extend under the shift key shanks so that keys 151 and 152 are operable only on lever 168 and that keys 153 and 14 are operable only on lever 169. When the latter lever is rocked counter-clockwise it also actuates means (not shown here) for engaging the carriage power unit with the right traversing mechanism, as described in the parent application. Normally the left traversing mechanism is coupled with the power unit, as may be seen in FIG. 18.

Keys 152 (FIG. 13) and 153 may be released at random from depressed position. The parts operated by these keys are then returned by their respective springs and arrester lever 112 will stop the carriage power unit at the completion of that revolution in which its lug 122 engages the periphery of disc 115. If member 156 is held in operated position manually by means of depression of either key 152 or 153 until the carriage shifts to a preselected or end position, the tabulation mechanism will rock the bellcrank 155 counter-clockwise, as by its lateral lug 170, to disengage the bellcrank from lever 124. This operation will occur in sufficient time to permit the arrester lever 112 to stop the carriage power unit at the completion of the revolution for the shift to that particular position. Random release of keys 10, 151 and 14 is not possible. Termination of such shift operations is fully automatic. The tabulation mechanism disengages bellcrank 155 from lever 124 and also releases the operated key when the carriage shifts to the end position, or when the carriage shifts to a preselected position and the operated key is carriage return key 10.

As viewed in FIG. 15, lever 126 is rocked counterclokise to initiate shift operations. Such actuation of lever 126 is performed by several control means operated automatically. One control is operable consequent disengagement of the entry and carry mechanisms from the carriage borne register mechanisms after completion of each product entry and carry operations. Another control is operable when a "0" value quotient is obtained and still another control is provided for when the overdrafting trial quotient is "1."

Detent 171, as seen best in FIG. 15, is pivotally mounted on fixed stud 172 on the machine frame, and serves to hold the carrier bail 173 in elevated position so that the entry and carry mechanism carried by the carrier bail 173 is engaged with the carriage borne register mechanisms which comprise a gear train and a dial in each order. Early in a multiplying cycle of operations, 173 is elevated to effect engagement of the entry mechanisms with the register mechanisms for subsequent actuation of the registers by the entry mechanisms. A torsion spring 171a, fastened to detent 171 and to the machine frame, then rocks the detent counterclockwise to the position illustrated to hold 173 in engaged position. Detent 171 is formed with surface 171b which underlies roller 173a mounted on rod 173b of the carrier bail 173, which will be described. After the entry and carry operations are completed, detent 171 is rocked clockwise to move its surface 171b out from under roller 173a to allow 173 to move downwardly thereby to disengage the entry mechanisms from the register mechanisms, except when an overdraft occurs during division. If the value of the too large quotient is "1," detent 171 is rocked clockwise subsequent withdrawal of the quotient from the register therefor and adding back to the dividend remainder the overdrafting amount. Depending arm 174 of detent 171 has in its path (with respect to the clockwise stroke thereof) lateral lug 175 on lever 176 which is also moutned pivotally on stud 172. The depending end of lever 176 has pivoted thereon hook 177 which is normally latched on lateral lug 178 on the upper arm of bellcrank 179 fulcrumed on shaft 113. Spring 180, fastened to hook 177 and to the machine frame, urge the hook clockwise to its latching position and serves to urge the lever 176 counter-clockwise to normal position with its finger 181 against fixed stud 182 on the machine frame. The depending arm of bellcrank 179 has pivoted thereon a member 183 which is urged clockwise against stud 184 on the bellcrank arm by torsion spring 185 fastened to the arm and to the member. In normal position of member 183, integral finger 186 is in contact with lateral lug 187 on lever 126 so as to rock the lever 126 counter-clockwise when bellcrank 179 is so moved by hook 177 in response to the clockwise actuation of lever 176 by the detent 171. After shift initiation is effected, detent 171 is returned counter-clockwise sufficiently to permit lever 176 to return to its normal position, whereupon bellcrank 179 is returned against stud 188 on the machine frame by spring 189 fastened to a stud on the frame and to a depending projection on member 190 which is pivotally mounted on the stud 184. Member 190 is reciprocated by the division power unit for effecting shift initiation when a selected quotient is "0," as seen also in FIG. 10.

Hook 177 (FIG. 15) overlies stud 191 on the upper arm of lever 192 which is pivotally mounted on shaft 193 fixed on the machine frame. The depending arm of lever 192 is yieldably connected to one end of a link 194, the connection being formed by pin 192a on lever 192 being received in slot 194a with tensioned spring 194b, fastened to 192 and 194, holding the pin against the rearward end of the slot. Link 194 may be moved rearwardly in the machine to effect disengagement of hook 177 from bellcrank 179 as in response to operation of addition key 5, FIG. 1, subtraction key 6 or the non-shift key 8, as described in the parent application. In the latter instance when division cycling is initiated, member 195 (FIG. 15) of the division key triggered conditioning mechanism is pulled forwardly. At such times, stud 196, protruding laterally from the left and right faces of member 195, will rock the lever 192 counter-clockwise, thereby to effect reengagement of hook 177 with bellcrank 179. The yieldable connection between the lever 192 and the link 194, with pin 192a sliding forwardly in slot 194a, permits lever 192 to be turned counter-clockwise without upsetting the non-shift key setting.

In normal position of member 183, the rearwardly extending integral hook-arm 197 stands over lateral lug 198 on the depending arm of lever 199 which is also fulcrumed on shaft 113. During division cycling of the machine when the dividend is eliminated or the carriage shifts to a preselected, or an end position, member 183 is rocked counter-clockwise about its pivot so as to engage hook 197 with lug 198 and disengage arm 186 from lever 126. Thus the shift operation is not initiated. Instead, the division conditioning mechanism and the parts operated thereby are returned. Since each successive operation of the division power unit is dependent on operation of the carriage power unit, as will be explained presently, preventing the initiation of a shift operation will effect termination of division operations.

For rocking member 183 counter-clockwise, hook 200 is latched on to the stud 201 on member 183 and is pulled upwardly. Stud 196 on member 195 of the conditioning mechanism normally holds the link 200 at a position rearward of the stud 201, as shown. When the machine is conditioned for division, member 195 moves forwardly, whereupon spring 202, fastened to link 200 and to stud 203 on the machine frame, swings the link counter-clockwise to engage it with stud 201. The upper end of link 200 (not shown in this view but seen in FIG. 10), is pivotally connected to means actuated by an eliminated dividend sensing mechanism, when the dividend is eliminated, and by the tabulation mechanism, when the carriage shifts to a preselected or to the left end position.

The means for actuating link 200 is represented generally in FIG. 10 by 204, and the eliminated dividend sensing means and tabulating mechanism which actuate 204 are represented respectively generally by 205 and 206. The several controls provided for actuating the lever 126 are also represented generally by 1C, 2C and 3C. 1C represents the multiplying power unit operated control for effecting shift initiation after a product is registered, and 38a represents generally the linkage means between 38 and 1C. 2C is the normally disabled control operable by the multiplying power unit 38 for effecting shift initiation after the overdrafting amount is restored during division operations and the too large trial quotient is "1," and 38b represents generally the linkage means between 38 and 2C. The overdraft sensing means, represented by ODS, disables control 1C, and the quotient value means, represented by QV, renders control 2C operable when the too large quotient value is "1." Shift initiation is also effected at times by control 3C which is operated by the dividing power unit 83, through linkage means represented generally by 83b, after each trial quotient selection is made. Control 3C however, is rendered ineffective by quotient value means QV when the selected trial quotient value is other than "0."

(4) *Division Power Unit and Arresting Means*

The division power unit 83 (FIG. 6) is formed as follows: A sleeve 207 is rotatably mounted on shaft 40 with cam 208 and gear 209 secured respectively to the left and right ends of the sleeve for rotating therewith. Cams 210, 211 and 212, and arrester unit 213 are disposed between cam 208 and gear 209 with suitable annular spacers 214 therebetween. Rods 215, extending through the cams, spacers and gear, are utilized for holding them together as a unit.

The division power unit 83 is constantly urged to rotate, as will be described presently, through its gear 209. Rotation of the unit is clockwise as when viewing arrester unit 213 in FIG. 14. In a revolution of 360 degrees, the cams of the division power unit operate mechanisms for the performance of a trial quotient digit computation. Normally, rotation of the power unit is prevented by its arrester unit 213 being held by arrester lever 216 which is fulcrumed on shaft 193 secured on the machine frame. With the exception of minor structural differences, unit 213 is similar in construction to the arrester unit 105 (FIG. 13) for the carriage power unit 100. Member 217 (FIG. 14) is secured to the division power unit by the rods 215 and rockable coaxially mounted member 218 is formed with a suitable hole for clearing the rods 215 and with lost motion slots 219 in which studs 220 on member 217 are received. The studs 220 limit angular movement of parts 217, 218 with respect to each other and prevent lateral or axial displacement of 218. Suitable openings are provided on member 218, as shown, for receiving in each an expansion spring 221, one end of which is fastened to or engaged with member 218 and the other end is engaged with member 217. These components of unit 213 operate and perform the function of cushioning the stop-shock as do the corresponding components of the aforedescribed carriage power unit stop-start means.

In the stop-start position of member 218, intgeral lug 222 contacts lateral lug 223 on arrester lever 216. In order to initiate operation of the division power unit 83 (FIG. 6) it is required only to rock lever 216 (FIG. 14) counter-clockwise sufficiently to disengage the lugs 222 and 223. To effect stopping of the unit 83, it is required only to return the lever 216 clockwise, as seen in FIGURE 14, so that its lug 223 rides the periphery of member 218 to intercept the lug 222 at the end of the 360-degree revolution. Actuation of lever 216 to start operation of the division power unit for the first trial quotient digit is performed by the conditioning mechanism which is responsive to the operation of a division key. Thereafter, actuation of the lever to start operation of the power unit for each successive trial quotient digit is performed automatically by the carriage power unit in the final phase of the shift operation.

The depending arm of lever 216 is formed with a lateral lug 224 which lies in the path of latch shoulder 225 on member 195 of the conditioning mechanism so that on the forward stroke of the member, lever 216 is rocked counter-clockwise sufficiently to disengage from the arresting unit 213. Forward of the latch formation 225, member 195 is supported by a roller 226 carried on the depending arm of lever 227 which is fulcrumed on shaft 193. Spring 228, fastened to member 195 and to a fixed stud on the machine frame, serves to hold the member rearwardly and downwardly in the normal position, as illustrated, and to hold the lever 227 in its normal position against fixed stud 229 on the machine frame. The upper arm of lever 227 is provided with a lateral tab 230 which lies in the path of a lateral lug 231 formed on member 217. During the initial phase of the power unit's revolution, lug 231 rocks the lever 227 counter-clockwise to elevate the member 195 sufficiently to disengage its latch shoulder 225 from the lug 224. Torsion spring 232, fastened at one end to lever 216 and to a fixed stud on the machine frame, will then turn the lever clockwise until its lug 223 contacts the periphery of member 218. Thus the lug 223 is in position to intercept the lug 222 at the completion of a 360-degree revolution of the power unit.

A depending hook 233 is pivoted on the upper arm of arrester lever 216. This hook is formed with a stepped surface 234 and with a lateral lug 235 which lies in the path of vertical lateral lug 236 formed on the upturned rearward end of member 195. Lug 236 is of sufficient vertical length to stand in engaging relation with the lug 235 at all times. Spring 237, fastened to hook 233 and the upper arm of lever 216, serves to turn the hook clockwise and hold it in normal position as limited by its lateral tab 238 which underlies the lever 216. Lever 239, secured to one end of sleeve 239a rotatably mounted on journaled shaft 113, extends forwardly in the machine and carries lateral lug 240 on its free end. The other end of sleeve 239a has follower 128 secured thereto for turning therewith. Roller 129 on the follower overlies the periphery of cam 104 of the carriage power unit. The cam is so constructed that during the final phase of its clockwise revolution it rocks the follower and the unit formed therewith clockwise. On the forward stroke of member 195 of the conditioning mechanism, hook 233 is rocked counter-clockwise so that its step 234 stands under lug 240 of lever 239. Hence, during the final phase of each shift operation, lever 239 engages the hook and rocks lever 216 counter-clockwise to initiate operation of the division power unit.

In FIG. 10 the just described control is represented generally by 6C, and 100a represents generally the linkage means between the carriage power unit and 6C.

(5) *Tabulation*

In the exemplary embodiment herein shown, provision is made for ten ordinal positions of the carriage, two end or extreme positions and eight intermediate positions. The tabulating mechanism automatically causes the stop-start means to arrest the carriage power unit whenever the carriage shifts to an end position, and the mechanism may also be selectively conditioned and rendered operable to cause stopping of the carriage at any ordinal position between the extremes.

Eight keys 11 (FIG. 1) are provided for conditioning the mechanism. Each key, reading from left to right, is designated by a numeral 2 to 9 which represents the ordinal position of the carriage for which the mechanism will be conditioned upon depression of that key. Even though the tabulating mechanism is in its conditioned state, it is normally inoperable. In order to be effective, the mechanism must also be rendered operable. This is accomplished by means operated automatically by the carriage power unit when cycling is initiated by carriage return key 10, left and right keys 152, 153, or divide tabulation key 13, as will be described presently.

Keys 11 (FIG. 24) are pivotally mounted on shaft 241 of the keyboard dials 242, which is journaled on frame members 26 and 31, FIG. 19. These keys are locked down automatically upon depression and are held in depressed position until released by depression of either of the two clearing keys 243, one situated at each end of the keys 11. Directly under each key 11 is a latch-pawl 244 (FIG. 24) formed of any suitable flexible material, as for example, spring steel, and secured to shaft 245 for turning therewith, the shaft being journaled on frames 26 and 30, FIG. 19. A release member 246 is fixed to shaft 245 towards each end thereof. The free end of each release member 246 underlies one of the clearing keys 243 so that upon depression of one of the keys 243, the unit formed of the parts 246, 245 and 244 will swing counter-clockwise as seen in FIGURES 23 and 34. The unit is urged clockwise by a pair of torsion springs 247, FIG. 23, each of which is fastened to a mmeber 246 and to a member 248. The latter member is journaled on shaft 241 and is held stationary by its depending arm which is bifurcated to embrace fixed shaft 249 on the keyboard mechanism frame.

In normal position each latch-pawl 244 (FIG. 24) is flexibly pressed against the rounded rearward face on hook 250 formed under the forward end of the related key 11, thereby to cam the key upwardly to normal position, against the overlying cover plate 251. When a key is depressed sufficiently, its flexed latch 244 snaps clockwise into the recess formation of hook 250 thereby to hold the key in depressed position. The latching action of one latch 244 does not expend the flexure of other latches which are individually flexible. Hence more than one key 11 may be depressed and locked to condition the tabulating mechanism for as many tabular positions of the carriage. Depression of either clearing key 243 (FIG. 23) rocks the aforedescribed unit of parts 246, 245 and 244 (FIG. 24) counter-clockwise to disengage latches 244 from hooks 250 of depressed keys, whereupon the keys are returned by their respective springs which will be described.

Adjacent each key 11 an ordinal member 252 is fulcrumed on shaft 241. Stop initiating members 253, one for each ordinal member 252, are pivoted on shaft 254 which is journaled on frame members 26 and 31, FIG. 19. Each stop member 253 (FIG. 24) is formed with a recess on its forward end for receiving lateral extension 255 on the rear extremity of its related member 252 so that angular actuation of member 252 will rock stop member 253. U-shaped bail 256 is secured to shaft 241 toward the ends thereof for rotary movement therewith, FIG. 19, and a generally depending lever 257 is also secured to the shaft at its right end for turning therewith. Torsion spring 258, fastened to frame 31 and lever 257, urges the unit formed of shaft 241, bail 256 and lever 257 (FIG. 25) clockwise to normal position with bail 256 (FIG. 22) contacting a suitable stop, such as surface 259 on frame 31. Bail 256 stands in the path of generally upright arms 260 (FIG. 24) of members 252 with respect to clockwise movement of the members. Hence, in this position bail 256 holds members 252 in a counter-clockwise position at which the stop members 253 coupled therewith are held out of the path of transverse movement of compressive cylinder 261 carried by the carriage. In this state the tabulation mechanism is referred to as being inoperable.

A torsion spring 262 is disposed between each member 252 and its related key 11 and is fastened respectively to each to maintain the rearward extension of the key in contact with lateral lug 263 of the member. Depression of a key 11 increases the tension of its spring 262 which then will serve to return the key and/or to rotate the associated member 252 clockwise when bail 256 is swung clockwise, as will be described. Such rotation of member 252 rocks the coupled stop member 253 counterclockwise into the path of cylinder 261 for axial actuation by the cylinder, also to be described. With a stop member 253 in the path of the cylinder, the tabulating mechanism is in its operable state.

Referring to FIG. 25, the forward end of link 264 is pivotally connected to the lever 257, and the other end of the link carries a stud 265 which is received in a cam slot 266 on the free end of depending lever 267. The lever 267 and a follower 268, which carries a roller 269, are secured to a sleeve 270 to form a unit with the sleeve rockable on shaft 113. Hook member 271, fulcrumed on stud 265, has a lateral lug 272 which overlies link 264 for limiting counter-clockwise rotation of the hook 271, whereby to form a unit of the hook and link rockable counter-clockwise about the link's pivot on lever 257. Tensioned spring 273, fastened to lever 267 and hook 271, tends to elevate the link-hook unit, but the unit is normally held in a depressed position as limited by the stud 265 in slot 266. In this position of the parts, stud 265 holds the lever 267 in a counter-clockwise position so that the roller 269 of follower 268 is normally free from contact with the periphery of cam 103 of the carriage power unit, which periphery is formed with increasing and diminishing radii so as to rock follower 268 once in each revolution of the cam when the roller 269 is engaged with the cam.

Depression of link 264 is accomplished by lever 274, the rearward end of which overlies lateral lug 275 of the link. Lever 274 is pivotally mounted on shaft 157 and its forward arm underlies the shanks of shift keys 152 and 153 for counter-clockwise actuation thereby. A lateral lug 276 on the lever 274 is embraced by the bifurcated arm of bellcrank 277 which is fulcrumed on shaft 278 of the keyboard mechanism frame. Spring 279 is fastened to bellcrank 277 and to a suitable stud on frame member 22 for rocking the bellcrank counter-clockwise, whereby lever 274 is swung clockwise to depress the link-hook unit 264, 271 to its normal position.

Lever 274 is rocked counter-clockwise about shaft 157 in response to depression of shift keys 152, 153, carriage return key 10 (FIG. 1) and divide tabulation key 13. Keys 152 and 153 (FIG. 25) are operable directly on the lever. For actuation by the carriage return key the rearward arm of the lever 274 is formed with a hook 280 which overlies stud 281 on pawl 161 so that elevation of the pawl will swing the lever counter-clockwise. Referring to FIG. 13 it will be recalled that pawl 161 is moved upwardly each time key 10 is depressed. Actuation of lever 274 (FIG. 25) may be performed by means such as lever 282 which is secured to shaft 283 journaled on the machine frame. The free end of lever 282 has a lateral lug 284 which overlies the generally depending arm of bellcrank 277 so that counter-clockwise actuation of the lever rocks the bellcrank clockwise thereby to swing lever 274 counter-clockwise. Shaft 283 is rocked counter-clockwise in response to depression of the divide tabulation key as disclosed in the parent case.

Counter-clockwise movement of lever 274 permits spring 273 to elevate the link-hook unit. Stud 265 of the unit moving upwardly in curved cam slot 266 (FIG. 27) cooperates with the slot to rock the lever 267 clockwise sufficiently to effect engagement of roller 269 (FIG. 25) with the minor radius peripheral portion of cam 103. Then in the initial phase of the first cycle of the carriage power unit, cam 103 rocks follower 268 (and the unit formed therewith) counter-clockwise to pull the link-hook unit rearwardly sufficiently to rotate shaft 241 counter-clockwise for rendering the tabulation mechanism operable.

Stud 144 on frame 22 stands in the path of upturned formation 285 on the rearward end of hook 271. While the hook is moving upwardly, upturn 285 contacts stud 144, causing the hook to rock clockwise about stud 265. Consequently, when the hook-link unit is stroked rearwardly sufficiently to move 285 out of the path of stud 144, spring 273 will rock hook 271 counter-clockwise to latch it onto the stud. In latched position, hook 271 holds the parts connected thereto in operated position until the shift initiating key is returned. When this occurs, lever 274 is returned downwardly to depress the link-hook unit. Consequently, hook 271 disengages from stud 144 and spring 258 rotates lever 257 clockwise thereby to return the link-hook unit forwardly to normal position and to render the tabulation mechanism inoperable again.

Referring to FIG. 19, a stop member 286 is provided for each extreme position of the carriage. These members 286, supported on shaft 254, are similar to members 253. The extreme members 286 receive the lateral lugs 287 (FIG. 23) of stationary members 248 which at all times hold the members 286 in the path of cylinder 261. Stop members 253 (FIG. 19) and 286 are mounted on shaft 254 at spaced points corresponding to the ordinal positions of the carriage. The members may be mounted in any well known manner so as to block lateral displacement of the same on the shaft, when actuated axially by cylinder 261. Instead, shaft 254 is journaled for axial movement so as to respond to lateral actuation of a stop member 253 or 286 by the cylinder. Such movements of the shaft are limited as by rings 288 which butt against the faces of respective journals 289 secured on frames 26 and 31. Rings 288 are mounted in suitable annular grooves on the shaft.

The relationship between cylinder 261, carried by the carriage, and the stop initiating members is such that when the carriage is at an ordinal position (assuming that the stop member of that position is not in the path of the cylinder) the cylinder overlies the stop member of that position and is generally midway between the adjacent stop members, and the respective faces of the cylinder are generally equidistant from those members. For example, assuming that the 4th ordinal stop member 253 is in the path of the cylinder and the carriage is traversing either leftward from the 3rd ordinal position or rightward from the 5th position, the respective left or right face of the cylinder engages the 4th ordinal stop member early in the current cycle and shifts the shaft 254 in the respective direction.

The axial movement of shaft 254 is completed before the carriage completes its shift to the respective ordinal position. Accordingly, cylinder 261 is provided with yielding or lost motion means to permit the carriage to complete its shift. Referring to FIG. 20, two bearing members 290 are slidably mounted on shaft 291 between a pair of split rings 292 mounted in annular grooves. The shaft is secured to carriage frame members (not shown). An expansion spring 293 between the bearings urges the bearings axially against the rings. The cylindrical casing 261 is slidably supported by the bearings and it is rolled over on its ends sufficiently to embrace the bearings so as to prevent random sliding of the casing. If, for example, the carriage is moving leftward and the cylinder shifts the left extreme stop 286 (FIG. 21) leftward its limited extent, then casing 261 and the left bearing 290 are arrested by the stop, but the right bearing continues to move leftward with the carriage for the remainder of the shift and compresses the spring 293.

Whenever the carriage is at an extreme position, the cylinder remains in its compressed state until the carriage is moved in the opposite direction, away from non-rockable or fixed stop 286. Then spring 293 restores the cylinder to its normal state, FIG. 20. If compression of the cylinder is effected by a stop member 253, FIG. 24, the cylinder is restored to its normal state when the effective stop member 253 is turned clockwise, out of the path of the cylinder by the return stroke of bail 256. The bail is returned at or about the end of the cycle in which termination of the shift occurs, as previously described. Moving the cylinder away from stop 286 or rocking the effective stop member 253 out of the path of the cylinder allows shaft 254 to be returned axially to its normal position, as will be described presently. In its normal state and at an intermediate position, cylinder 261 overlies the stop member of that position. That stop cannot be swung into the path of the cylinder until the carriage has been shifted to an adjacent position. In the event more than one stop 253 is swung into the path of cylinder 261, shift termination will occur when the carriage shifts to the position corresponding to the first obstructing stop member 253. If a subsequent shift cycle is initiated by the return key 10, left key 152 or right key 153 (assuming that the shift is again in the same direction and that, if one of the latter two keys is used, it is held depressed indefinitely) cycling will terminate when the carriage shifts to the position corresponding to the next obstructing member 253.

Disc 294, FIG. 29, secured to the right end of shaft 254 is embraced by a pair of vertical fingers 295 on rocker 296 which is fulcrumed on bracket 297 fixed to frame member 22. Rocker 296 is also formed with a pair of horizontal ears 298, one protruding from each side of the rocker. A leftward shift of shaft 254 will swing rocker 296 counter-clockwise and elevate right ear 298, and a rightward shift of the shaft will swing the rocker clockwise and elevate its left ear. A U-shaped member 299, FIG. 25, pivotally mounted on stud 300 on frame 22, has a pair of spaced arms 299a, each of which extends forwardly and overlies one of the ears 298. Elevation of either ear 298 rocks member 299 clockwise.

Torsion spring 301, fastened to an arm 299a of member 299 and frame 22, urges the member counter-clockwise thereby to return rocker 296 and shaft 254 to normal position. Member 299 has a generally depending arm on the free end of which a generally upright pawl 302 is fulcrumed. Stud 303 on the depending arm of 299 stands in the path of the pawl to limit its clockwise movement by torsion spring 304 fastened thereto and to member 299. Pawl 302 is formed as a hook on its upper end and has a depending finger 305. It will be recalled that lever 156, carrying bellcrank 155, is elevated in response to depression of any shift key to effect shift initiation. In elevated position, lug 170 on bellcrank 155 is in the path of clockwise movement of pawl 302 about pivot 300. Then, when the pawl is stroked clockwise about stud 300, it engages the lug 170 to rock bellcrank 155 counter-clockwise to disengage the same from stud 154 on lever 124, thereby terminating the shift operation, as previously described. In the final phase of its clockwise stroke, finger 305 contacts stud 306 which causes the pawl to rock counter-clockwise about its pivot 307 to disengage it from lug 170. Stud 306 is fixed on frame member 22.

Link 308, the rear segment of which is shown connected to depending arm 299, is reciprocated by the arm to cause the lock mechanism for the shift keys 10 (FIG. 1), 151 and 14 to release the depressed one of the keys, as described in the parent application.

Referring to FIG. 19 again, a disc 309 is secured to the left end of shaft 254. This disc serves to actuate member 200 (FIGS. 15 and 10) as disclosed in the parent application. When shaft 254 is shifted leftward, the only direction in which it is shifted during division, disc 309 actuates member 200 (FIGS. 10 and 15) as disclosed in the parent application. Thus, during division cycling member 200 effects termination of division operations, as described hereinbefore.

(6) *Driving Mechanism*

The main operating mechanism comprises journaled shaft 40, FIG. 6, driving means (not shown here) for constantly urging the shaft to rotate, three power units, multiplying 38, carriage 100 and dividing 83 which, as previously described, are rotatably mounted on the shaft, and differentials 310 and 311 for so connecting the power units and the shaft that each power unit may, upon liberation, rotate either individually or concurrently with another of the units.

Shaft 40 has inner ball-bearing races 312 and 313 secured to its left and right ends respectively. Race 312 is received in an outer bearing race 314 supported in a suitable opening on bracket 315 which is fastened to frame plate 18, and race 313 is received in an outer race 316 which is mounted in a suitable hole on frame member 23. Displacement of shaft 40 leftward and rightward is prevented respectively by races 312, 314 and races 313, 316. The races 314 and 316 being supported against thrust respectively by plate 317, secured to bracket 315, and by plate 318, fastened to frame member 23.

Power units 38 and 83, and sleeve 111 on which carriage power unit 100 is rotatably mounted, are mounted for rotation on shaft 40 by antifrictional means 320. Gear 319, also rotatable on the shaft, is disposed between race 312 and pinion gear 321 which is secured to the shaft. Both gears will be described presently with more particularity in connection with the driving or motor means.

Figure 4:
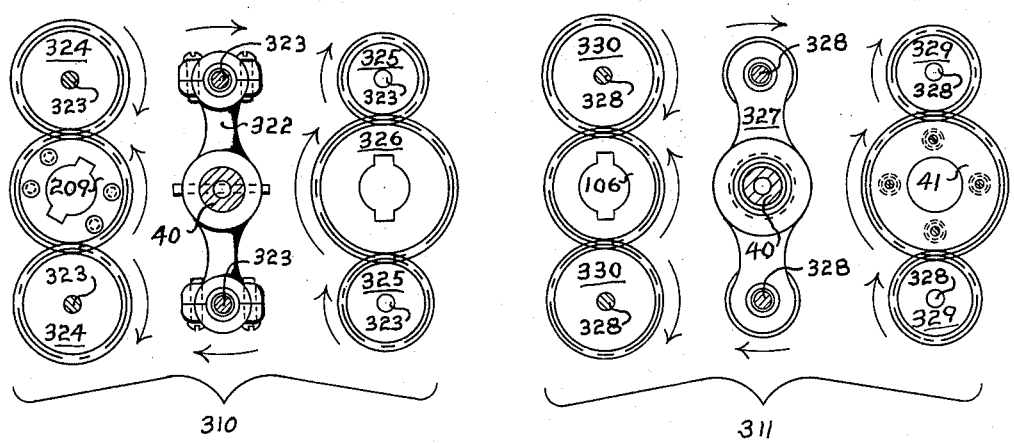
FIGURE 4 is a fragmentary sectional right side view of two differentials of the driving mechanism.

Division power unit 83 is situated between gear 321 and lever 322 of differential 310. As seen best in FIGURES 4 and 6, lever 322 is secured to the shaft 40 and supports a rotatable axle 323 at each of its ends. A gear 324 and gear 325 are secured respectively to the left and right ends of each axle 323. Gears 324 are of a larger diameter than gears 325. Gears 324 are meshed with gear 209 of the division power unit 83 and gears 325 are meshed with gear 326 secured to the left end of sleeve 111. The other end of sleeve 111 has lever 327 of differential 311 secured thereto. This lever also supports a journaled axle 328 at each of its ends. A gear 329 and gear 330 are secured respectively to the right and left ends of each axle 328. Gears 329 are of a smaller diameter than gears 330 which are meshed with gear 106 of the carriage power unit 100. Gears 329 are meshed with gear 41 secured to the left end of multiplying unit 38.

Whenever rotation of all of the three power units 38, 100 and 83 is prevented, shaft 40 is also held against rotation. The ratios between gears 106, 330, 329 and 41 are such that when both gears 41 and 106 cannot rotate, the lever 327 secured to sleeve 111 cannot be rotated. Hence, the gear 326 secured to the other end of sleeve 111 is held when both units 38 and 100 are held against rotation. In a similar manner the ratios between gears 326, 325, 324 and 209 are such that when gears 326 and 209 are held against rotation, the lever 322 cannot be rotated, and since lever 322 is secured to shaft 40, the constantly urged shaft is prevented from rotating. Upon liberation of any one of the three power units, shaft 40 rotates clockwise, as when viewed in FIG. 4. Assuming that the division power unit is the one liberated and that the multiplying and carriage units are held, the division unit with its gear 209 is free to rotate and gear 326 is held. Lever 322 swings clockwise causing gears 325 to rotate and revolve clockwise about held gear 326. Consequently gears 324 also rotate and revolve clockwise, but the ratios of the gears are such that gear 209 is rotated counter-clockwise. If the division unit is held and either the carriage or multiplying unit is liberated, then gear 209 is stationary and gear 326 is free to rotate. At such times the clockwise swing of lever 322 causes clockwise planetation of gears 324 about held gear 209. Hence gears 325 will also rotate clockwise and tend to rotate gear 326 counter-clockwise, but the ratios among gears 209, 324, 325 and 326 are such that the gear 326 will respond a greater extent to the planetation of gears 325 and definitely rotate clockwise. At times, as previously described, the multiplying or carriage power unit is liberated while the division unit is operating. When both gears 209 and 326 are free to rotate, the resistance of each liberated unit and the ratio differences between the gears 326, 325, 324 and 209 are such that as the lever 322 swings clockwise, planetation of gears 325 and 324 is effected whereby gear 209 (division power unit) is rotated counter-clockwise, and gear 326 (carriage or multiplying power unit) is rotated clockwise. Whenever the carriage or multiplying power units are liberated, the gear 326 and lever 327 are rotated clockwise as explained. If the carriage unit is the one liberated and the multiplying unit is held, gear 106 is free to rotate and gear 41 is stationary. At such times, the clockwise swing of lever 327 will cause clockwise planetation of gears 329 about gear 41. Gears 330 will also rotate and revolve as gears 329, but the ratios of the gears are such that gear 106 will rotate counter-clockwise in response to rotation of gears 330. When gear 106 is held and gear 41 is free to rotate, the clockwise swing of lever 327 will cause planetation of gears 330 clockwise about gear 106 and the gears 329 will tend to rotate the gear 41 counter-clockwise, but the ratios among gears 106, 330, 329 and 41 are such that the gear 41 will rotate clockwise in response to the planetation of gears 329 with the lever 327.

As previously described, the carriage power unit may be liberated while the multiplying power unit is operating. At such times, both gear 106 and gear 41 are free to rotate. The resistances of the liberated units and the ratio differences of the gears 106, 330, 329 and 41 are such that as the lever 327 swings clockwise, planetation of gears 329 and 330 is effected whereby gear 106 (carriage power unit) is rotated counter-clockwise and gear 41 (multiplying power unit) is rotated clockwise.

Shaft 40 is rotated counter-clockwise (FIG. 30) by a spring powered motor in which the spring 331 may be rewound manually or automatically. Referring to FIG. 32, the spring motor comprises shaft 332 journaled on main machine frames 18 and 19, a gear 333 secured to the shaft by key 334, another gear 335 rotatably mounted on the shaft and a flat type spring 331 between the gears and coiled about the hub 336 of gear 333. The inner end of the spring is hooked on to stud 337 on the hub, and the outer end of the spring is hooked in slot 338 on casing 339 formed on gear 335. The rim of casing 339 is received in a recess therefor on gear 333. Thus a drum is formed for the spring 331 which is so wound as to rotate the gear 335 (FIG. 30) clockwise for counter-clockwise rotation of meshed gear 321 and shaft 40. Spring 331 also tends to rotate gear 333 counter-clockwise, but such rotation of gear 333 is prevented, as will be explained. Clockwise rotation of gear 333 rewinds the spring 331. For reloading the spring 331 manually, the left end of shaft 332 (FIG. 32) is formed with a threaded hole to receive the threaded (right hand threads) on a crank 340. Clockwise turning of crank 340 (FIG. 30) will rotate shaft 332 and the gear 333 keyed thereto clockwise. For automatic reloading of spring 331, a small conventional electric motor may be utilized. As will be described presently, means are provided for starting such a motor when the spring unwinds a certain extent and for stopping the motor when the spring is rewound a predetermined extent. 341 represents the electric motor which is mounted on frame plate 15 and has a gear 342 secured to its rotor 343. Gear 342 is meshed with gear 344 rotatably mounted on shaft 345 which is fixed on frame members 18 and 19, FIG. 31. Referring again to FIG. 30, clockwise rotation of gear 342 will rotate gear 344 counter-clockwise. Gear 344 carries a pawl 346 pivoted at 347. Spring 348, fastened to the pawl and to stud 349 on the gear 344, urges the pawl counter-clockwise into engagement with a ratchet wheel 350 which is secured to a gear 351, FIG. 33. Gear-wheel unit 351—350 is rotatably mounted on hub 352 of gear 344, and the gear 351 is meshed with rewinding gear 333, FIG. 34. The engagement between pawl 346 (FIG. 33), and wheel 350 is such that as gear 344 (FIG. 30) is rotated counter-clockwise by the motor, the wheel-gear unit 350—351 is also driven counter-clockwise, whereby the gear 333 is rotated clockwise to rewind the spring 331. Through pawl 346, the clockwise urgence of gear 351 by spring influenced gear 333 tends to drive gear 344 clockwise. Also, when the gear 351 is rotated counter-clockwise, as in response to the manual clockwise rotation of gear 333, pawl 346 merely ratchets on the wheel. Hence, at such times gear 344, which is yieldably held against counter-clockwise rotation, as will be described, and the rotor 343 are not actuated. A detent 353, pivoted on stud 354 on frame plate 18, FIG. 33, is urged into engagement with gear 344 by torsion spring 355, fastened to the detent and to stud 356 on frame plate 18. The detent is formed with teeth 357 (FIG. 30) for so engaging the gear 344 that only clockwise rotation of gear 344 (as in response to urgence of spring 331) is blocked. When gear 344 is turned counter-clockwise, gear 344 coacts with teeth 357 so as to rock the detent clockwise. The tension of spring 355 is sufficient to hold gear 344 while pawl 346 and wheel 350 are ratcheting during manual rewinding of spring 331.

An electro-magnetic means 358, secured to the frame of the machine, is provided for holding detent 353 disengaged from gear 344 during automatic rewinding. The magnetic means is energized, as will be explained, from the time the motor 341 is started until it is stopped. Also, at the outset of each operation of the motor, the detent 353 is rocked clockwise, as explained, which movement is sufficient to move ferrous tab 359 formed on the detent into the magnetic field of the magnet means 358, whereupon magnet means 358 then draws the detent further clockwise so that teeth 357 are not in contact with gear 344. Thus the frictional restraint of detent 353 against counter-clockwise rotation of gear 344 is removed early in an automatic rewinding operation.

Operation of motor 341 and energization of magnetic means 358 is controlled, in one preferred form, by an automatically operated toggle switch. Referring to FIG. 36, 360 represents the blade that is received between pairs of spring contacts 361 so as to simultaneously close circuit 362 through 363 and 364 to the motor and the magnet means respectively. Contacts 361 are mounted on rear frame 16 (FIG. 30) and are insulated therefrom, and blade 360 (FIG. 36) is fastened to 365 which is secured to the free end of lever 366. Member 365 is formed of any suitable non-conducting material. The other end of lever 366 is mounted pivotally on stud 367 on bracket 368 which is secured to rear frame 16, FIG. 30. An upwardly extending lever 369 (FIG. 37) is also pivoted on stud 367, and spring 370 is fastened to studs 371 and 372 on levers 369 and 366 respectively. Spring 370 (FIG. 36) serves to swing the lever 366 rightward from the normal position shown to close the circuits, and leftward, back to normal position, to open the circuits when the lever 369 is moved sufficiently to carry the spring past pivot 367 respectively rightward in response to unwinding of the main spring and leftward in response to rewinding of the main spring. Studs 373 and 374 on bracket 368 are provided for limiting the extent of leftward and rightward movement of lever 366.

One end of a lateral link 375 is pivotally connected at 376 (FIG. 37) to the upper end of lever 369 and the other end of the link is pivotally connected at 377 to bifurcated member 378. The furcations on member 378 extend forwardly so as to be received in an annular groove 379 (FIG. 35) on disc 380. The arrangement is such that a predetermined extent of rectilinear movement of the disc rightwardly and then leftwardly will actuate lever 369, FIG. 37, to respectively effect "on" and "off" switching of the circuits.

Disc 380 (FIG. 35) is threaded to receive screw portion 381 on shaft 382 which is journaled on bracket 368, FIG. 36. Disc 380 is also mounted slidably on rods 383 (FIG. 35) spaced radially from shaft 382 and parallel therewith. The rods 383 are secured at their ends on collar member 384 and toothed wheel 385 which are mounted rotatably on shaft 382 respectively to the left and right of the screw portion. Thus parts 385, 383 and 384 are formed as a rotatable unit for turning disc 380 clockwise, as will be described. Another toothed wheel 386, similar to 385 is secured to shaft 382 toward its left end for rotating the shaft clockwise. The cooperation between the disc 380 and the shaft is such that clockwise rotation of the disc forwardly of the shaft causes the disc to travel rightwardly and clockwise rotation of the shaft forwardly of the disc effectuates leftward traverse of the disc. Wheel 385 is formed with teeth 387 about its periphery and is so aligned with gear 321 that the teeth 387 cooperate with axially elongated tooth or cog 388 on the gear. During each counter-clockwise revolution of gear 321 in response to unwinding of the main spring, cog 388 engages one of the teeth 387 to turn wheel 385 clockwise a certain angular amount. The ratios between the screw 381, disc 380, wheel 385 and gear 321 are such that the disc will traverse rightwardly sufficiently to initiate rewinding operations before the main spring is fully unwound or expended. Thus continuous cycling of the machine is made possible. Wheel 386 is formed with teeth 389 about its periphery, and is in alignment with gear 319 which also carries a cog. The relationship between wheel 386 and gear 319 is similar to that between wheel 385 and gear 321. As the gear 319 rotates counter-clockwise in response to rewinding operations, wheel 386 is rotated clockwise by the cog to traverse the disc 380 leftwardly to open the circuits, thereby to terminate the rewinding operation at about the time the main spring is fully rewound.

A detent 390 is provided for each wheel 385 and 386 to prevent random movements of the wheels. Both detents are alike, hence the description of one will also explain the other. The detent for wheel 385 is formed of a lever 390 with a roller 391 mounted on its forward end. The lever is pivotally mounted on shaft 392 which is secured on bracket 368, FIG. 36, and the roller 391 overlies the wheel 385. A torsion spring 393 is fastened to the lever and the bracket for urging the lever clockwise to hold roller 391 (FIG. 35) in contact with wheel 385. During the latter part of each actuation of the wheel by gear 321, the roller 391 cooperates with teeth 387 to urge the wheel clockwise to that position in which tooth 388 will engage a tooth 387 in an ensuing revolution of gear 321.

In this manner, it is seen that the constant energy replenishment by rewinding of the spring 331 causes the spring powered motor to act as an energy accumulator and hence ready at all times to instantly drive the main power shaft 40. Also, continuous rotation of main shaft 40 is possible without the need for running the motive source, such as motor 341, at all times.

(7) Governors

Normally, the multiplying power unit 38 (FIG. 6) is arrested at the end of one revolution, but, when an overdraft occurs during a division computation, the unit may operate uninterruptedly through several successive cycles, as previously explained. The carriage power unit 100 may also operate uninterruptedly through a number of successive cycles for shifting the carriage as many ordinal positions. Under such circumstances, the respective units may tend to rotate at accelerated speeds in response to the urgence of the previously described spring-powered motor and due to momentum. The division power unit 83 never operates more than one revolution at a time, but most of the forwarding and return strokes of the mechanisms actuated thereby are completed before the unit completes its 360-degree rotation. This, of course, would tend to permit the unit 83 to complete its revolution at accelerated speeds.

Therefore a governing means is provided for each power unit to prevent over-acceleration of the respective power unit and of the mechanisms actuated thereby. The means provided for the multiplying and carriage power units are responsive to centrifugal forces, and the means for the division power unit has resilient means to retard acceleration of the unit during the latter portion of its cycle. The governing means 42 for the multiplying power unit 38 will now be described.

Lever 394 is secured intermediate its ends to the unit 38 by the rods 52 for rotation with the unit. Referring to FIG. 8, a pair of carriers 395 are pivoted at 396 at each end of lever 394. A spring 397 is fastened to each carrier of a pair and to the corresponding carrier of the other pair for turning the respective carriers inwardly toward the axis of lever 394. The inward movement of each carrier is limited by integral finger 398 contacting a stud 399 on each arm of lever 394. A V-shaped brake-shoe mass 400 is mounted on the free end of each carrier, and a stationary circular brake-casing or drum 401, the internal periphery of which conforms to the shape of the brake-shoes, envelopes the shoes. The casing 401 is supported by the main shaft journal 316 (FIG. 6) which is fixed to the machine frame. The casing 401 is held to the machine frame by suitable spring clamps 402 which are fixed to the frame. The studs 403 on plate 8 extend through suitable holes in casing 401 to block turning of the casing.

In the normal position of the parts, as shown in FIG. 8, the shoes 400 are not in contact with the internal clutching surface of the casing 401, but, when the speed of rotation of lever 394 reaches a certain predetermined magnitude, the shoe-masses respond to centrifugal forces sufficiently to overcome the restraint of springs 397, swing outwardly about the respective pivots of the carriers and press against the casing 401 to prevent the multiplying power units from rotating faster than a predetermined maximum speed.

The governor 404 (FIG. 16) for the carriage moving mechanism is similar in structure and function to the above described governor 42 for the multiplying power unit. The carriers and brake-shoes of governor 404 are identical to the corresponding parts in governor 42, FIG. 8. The carrier-restraining springs of the two governors may differ only in tension for suitably varying application of the respective brake-shoes against the drums. Lever 405 (FIG. 16) and brake-casing 406 differ from the corresponding lever 394 (FIG. 8) and casing 401 in structural details, only for mounting purposes. The following description will, therefore, refer only to the mountings of these several parts. As will be described presently, journaled shaft 407 (FIGS. 16, 17, 18) of the shifting mechanism rotates in one direction or in the opposite direction while the carriage is being shifted either leftward or rightward, respectively. Lever 405 is mounted on the rearward end of shaft 407 which, in one preferred form, is square in cross-section thereat as seen in FIG. 17. Lever 405 is secured to shaft 407 by screw 408 and is formed with a hub on which a flanged journal 409 is mounted (FIG. 16). Brake-casing 406 is secured to the larger flange of journal 409. Thus the casing 406 is supported by shaft 407 without hindering rotation of the shaft. Turning of the casing is prevented by integral bifurcated extension 410 which embraces stationary stud 411 on the machine frame.

Referring to FIG. 18, bevel gear 107 is meshed with bevel 412 which is fixed to a scroll gear 413 rotatably mounted on stud 414 on the shift mechanism frame 415. Scroll gear 413 (FIG. 17) is meshed with a corresponding scroll gear 416 which is fixed to squared portion of shaft 407 also journaled on the frame 415, FIG. 18. Bevel gear 108 is meshed with bevel gear 417 which is secured to a scroll gear 418 rotatably mounted on a stud 419 on frame 415. Scroll gear 418 is meshed with a corresponding scroll gear 420 which is also secured on shaft 407. When gear 107 is coupled by member 109 and rotated thereby, shaft 407 rotates clockwise, but when gear 108 is coupled and rotated by member 109, shaft 407 rotates counter-clockwise.

Figure 3:
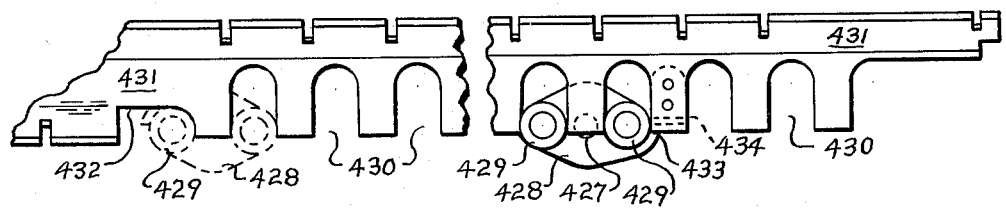
FIGURE 3 is a fragmentary view of the carriage feed bar and of the means cooperating therewith to shift the carriage.

The governor components are mounted on the rearward end of shaft 407, FIG. 16, and the forward end thereof has a gear 421 (FIG. 18) fixed thereto. Meshed gears 422 and 423, rotatable respectively on studs 424 and 425 on frame 415, couple gear 421 with a gear 426 which is fixed to shaft 427 journaled on frame 415 secured at its forward end on main frame bar 25. The ratios of the gear trains are such that for each 360-degree revolution of either gear 107 or 108, shaft 407 will rotate 360 degrees and shaft 427 will rotate 180-degrees for shifting the carriage one ordinal step. A lever 428 (see also FIG. 16) is secured to the forward end of shaft 427. Each arm of the lever has mounted thereon a roller 429. These rollers are received in ordinally disposed slots 430 (FIG. 3) on feed bar 431 which is secured to the carriage frame (not shown here). The arrangement is such that, as shaft 427 rotates 180 degrees, one of the rollers will shift the bar one ordinal step and the companion roller will enter the next consecutive slot. When the carriage stands at its rightmost position one of the rollers (shown in phantom) is seated in a shallower recess 432 which prevents further clockwise movement of member 428. Hence the carriage power unit will not operate in response to initiation for shifting the carriage further rightward. A shift beyond the leftmost position is prevented in a similar manner. With the carriage in its leftmost position, stepped projection 433 on lever 428 is in contact with plate 434 which is fixed to bar 431. The plate prevents the lever from turning counter-clockwise whereby operation of the carriage power unit for shifting the carriage further leftward is blocked.

The governing means for the division power unit 83 (FIG. 6) comprises cam 212 of the power unit, follower 435 (FIG. 7) pivoted on shaft 193, roller 436 mounted on the follower 435 so as to overlie and ride upon the periphery of the cam 212, and a suitable spring 437, fixed to the follower and to a stud 438 on the machine frame for urging the follower 435 clockwise, thereby to hold the roller 436 in contact with the cam. In the start-stop position of the parts, spring 437 is in its extended state, exerting greater pressure on the cam. The contour of the cam is such that during the initial phase of its clockwise revolution when the resistance on the division power unit is at its maximum, the spring powered follower 435 cooperates with peripheral portion 440 to urge the cam to turn clockwise. In the latter portion of the cycle, when resistance on the division power unit reduces to a minimum, peripheral portion 439 of the cam moves the follower 435 counter-clockwise to increase the tension of spring 437 again. Thus, when the division power unit would tend to over-accelerate, the increased resistance of spring 437 retards such acceleration.

(8) *Improperly Stopped Carriage Safeguards*

Normally the mechanism for shifting the carriage will always move the carriage to an ordinal position, as previously described. However, an obstacle such as a wall, partition, or another machine, standing in the path of the carriage may stop the carriage improperly as between two adjacent ordinal positions, without adverse affect on the carriage or its spring powered driving mechanism. In order to effect entry into the carriage borne registers however, the ordinally disposed register mechanism must stand in engaging relation with the ordinally arranged entry and carry mechanisms. Accordingly, safeguard means are provided for preventing cycling of the machine in response to an initiatory control when the carriage stands at other than an ordinal position, and for preventing an untimely shift of the carriage as when it is improperly stopped at other than an ordinal position and the obstacle is removed while the machine is cycled for a computation. At certain times, the afore-mentioned key lock mechanisms will prevent cycling of the machine when the carriage is improperly stopped, and at other times the safeguard means are effective, as will now be further described.

As disclosed in the parent application, upon depression of an initiating key all other cycling or initiating keys are locked against depression by the key lock mechanism. It was also stated hereinbefore that of the cycling keys, a depressed carriage shift key 10 (FIG. 1), 151 and 14 is held down until the carriage is shifted to a predetermined ordinal position. A predetermined position being either an extreme of a preselected position. During the final phase of the cycle for shifting the carriage to such a position, the depressed key is released automatically and concomitantly all the other cycling keys are liberated for depression. At times, the divide keys 12 and 13 are also locked in depressed position until the carriage is shifted to a predetermined ordinal position and the true quotient digit for that order is obtained. It can be understood then that when the carriage is stopped at other than a predetermined position and the depressed cycling key is either 10, 12, 13, 14, or 151, all other cycling keys are locked against depression by the key lock mechanism whereby cycling of the machine by another key is prevented.

Shift initiating keys 152, 153 and 4 (zero value) are held manually in depressed position and may be released at random even though the cycle for the ordinal shift of the carriage is not completed. A depressed multiplier key 4 for values 1–9 is locked down until it is released automatically in the final phase of the multiplying cycle initiated thereby. The release of the depressed multiplier key is not dependent on the shift cycle which is initiated automatically during the multiplying operations. Consequently, the release of a depressed multiplier key for values 1–9 may occur while the carriage is improperly stopped between two adjacent ordinal positions whereupon all cycling keys, except divide keys 12 and 13, would be depressible. Effectivity of the depressible keys varies. Since the shift mechanism is stalled, depression of a shift key is ineffective to cause the shift mechanism to operate even for shifting the carriage away from the obstacle. The coupling operation required for driving the carriage in an opposite direction is not possible unless the carriage power unit and the traversing mechanism are in stop-start position, as explained. On the other hand, depression of a multiplier key 4, 1–9, add key 5 or subtract key 6 is effective to trigger the initiating mechanism to start the multiplying cycle of operations. If the carriage were stopped between two adjacent ordinal positions, the product register mechanisms would be displaced laterally with respect to the ordinarily disposed entry and carry mechanisms whereupon proper engagement of the mechanisms would not be possible. Hence, a means is provided to prevent the triggered initiating mechanism from starting the multiplying cycle of operations unless the carriage stands properly at an ordinal position.

In FIG. 9 the initiating mechanism is shown in cocked position. Detent or latch member 69 is engaged with lug 68 of lever 66 to prevent clockwise movement of the lever. In cocked position of lever 66, its lug 67 holds the detent 53 in the path of the stop member 43 of the multiplying power unit 38. Disengagement of detent or latch 69 from lug 68 permits both the lever 66 and detent 53 to swing clockwise, whereupon the detent 53 disengages from member 43 to permit the multiplying power unit to rotate.

The forward part of lever 66 (FIG. 28) extends through and is movable in a guide slot 441 formed by depending extensions 442 on frame member 25. The extensions are provided for supporting the lever against lateral stresses and deflection. Further forward, the extremity of lever 66 carries lateral extension 443 the end of which is bent downward, parallelly with the lever. Extension 443 conforms in width with the ordinally disposed slots 430 of the aforedescribed feed bar 431 which is secured to the carriage frame and is utilized for shifting the carriage. The relationship between the carriage feed bar 431, slots 430 and lateral extension 443 is such that in each ordinal position of the carriage one of the slots 430 aligns with extension 443. The aligned slot allows lever 66 (FIG. 9) to swing upwardly sufficiently to permit detent 53 to disengage from member 43. If the carriage is stopped between two adjacent ordinal positions, one of the surfaces 444 (FIG. 28) between the slots 430 will stand in the path of extension 443. Thus the upward movement of triggered lever 66 is prevented and the multiplying drive unit is not released for a cycle of multiplying operations until a slot 430 is again aligned with the extension.

Lever 66 also serves to prevent an untimely shift of the carriage during the initial phase of a multiplying cycle. An unlikely but possible untimely shift condition may arise as when the carriage is stopped by an obstacle at an ordinal position. The nib 123 (FIG. 13) of stop wheel 115 might be displaced counter-clockwise of the lug 122 of arrester 112, due to the taking up of the operational clearances among the associated parts. Then upon removal of the obstacle, the power unit would be free to shift the carriage. If a multiplying cycle of operations were initiated inadvertently prior to the removal of the obstacle, the carriage shift might be untimely with respect to the multiplying operations. While the extension 443 (FIG. 28) is situated in a slot 430, lever 66 prevents the carriage from shifting. The lever, as described, is re-cocked early in the multiplying cycle, but before the withdrawal of extension 443 from slot 430 occurs, another means is brought into operation for preventing an unlikely but possible carriage shift. Carriage feed bar 431 (FIG. 26) is formed on its leftward end with ordinal slots 445 so disposed that in each position of the carriage one of the slots aligns with upwardly extending finger 446 on bar 447. This bar, as disclosed in the parent application, is a part of the carrier bail for the entry carry mechanisms. The carrier comprises bar 447 and companion bar 447a (FIG. 1b) fixed to journaled shaft 447b. The free ends of the companion bars 447, 447a are secured together by rod 173b on which a plurality of ordinally disposed gears 447c are rotatably mounted. Gears 447c are part of the entry and carry mechanism and are elevated by the carrier bail to engage with the carriage borne ordinal gears 447d (FIGS. 15 and 24). A roller 447e (FIG. 1b) mounted on bar 447a overlies cam 48 of the multiplying drive unit 38, FIG. 6. The periphery of cam 48 (FIG. 1b) is such that in the initial portion of its revolution, it elevates the carrier bail to mesh gears 447c with gears 447d, and that in the final portion of its revolution, when the registering operations are completed, cam 48 allows the carrier bail to return downward to normal or rest positions upon disengagement of detent 171 (FIG. 15) from roller 173a, as previously described. Thus the carrier is elevated in the early phase of each multiplying cycle to engage the entry and carry mechanism with the carriage-borner register mechanisms, and it is not lowered to normal or rest position again until the registering operations have been completed. Elevation of bar 447 (FIG. 26) also inserts its finger 446 in the aligned slot 445, thereby to prevent an untimely shift of the carriage. Frame member 25 is formed with a slot 448 for embracing the finger 446 thereby to prevent deflection of finger 446 and lateral displacement of the carrier bar. Elevation of bar 447 occurs prior to disengagement of lever 66 (FIG. 28) from bar 431.

Provision is also made for preventing initiation of a division cycle of operations when the carriage is stopped between two adjacent ordinal positions and for preventing an untimely shift of the carriage during division cycling. Lever 449, FIG. 26, pivoted on shaft 193, extends generally upwardly through slot 450 on frame member 25 and stands in alignment with one of the slots 445 on feed bar 431 in each ordinal position of the carriage.

Member 25 supports lever 449 against lateral stresses. Tensioned spring 451, fastened to lever 449 and sto stud 452 on frame 19 swings the lever counter-clockwise into an aligned slot, 445. The depending portion of lever 449 is formed with two lateral lugs 453 and 454. Detent 455, pivoted at 456 on the machine frame is latched the lug 453 to normally hold the lever in cocked position, as illustrated. Torsion spring 457, fastened to detent 455 and to the machine frame, urges the detent counter-clockwise to latching position. The detent is also in contact with lug 224 of arrester lever 216 for the division power unit. Lug 454 of lever 449 stands in the path of lug 224 with respect to counter-clockwise movement of arrester lever 216. In normal or rest position of levers 216 and 449, the lugs do not contact each other. It will be recalled that division cycling is initiated by arrester lever 216 (FIG. 14) being rocked counter-clockwise to disengage it from the division power unit. The relationship between lever 216, FIG. 26, detent 455 and lever 449 is such that counter-clockwise movement of the lever 216 rocks detent 455 clockwise so as to disengage it from lever 449 before lug 224 of lever 216 contacts lug 454 of lever 449, and thereafter lever 216 disengages from the power unit. Normally, the triggered lever 449 swings counter-clockwise into an aligned slot 445 on bar 431 whereby lug 454 of lever 449 moves ahead of lug 224 an extent sufficient to permit lever 216 to disengage from the power unit. If the carriage is stopped between two adjacent ordinal positions, the between-slot surface 444 on bar 431 serves to prevent the triggered lever 449 from swinging counter-clockwise. Then lug 454 stands in the path of lug 224 to prevent the lever 216 for swinging counter-clockwise sufficiently to disengage from the power unit. Lever 449 is formed with the lateral lug 458 which stands in the path of finger 459 on member 460 so that the clockwise movement of the member will recock lever 449 by relatching it with detent 455. In the latter phase of each revolution of the division power unit, member 460, fulcrumed on shaft 193, is rocked clockwise by roller 461 on cam 211 for initiating a shift cycle in the event the trial quotient digit is 0 and, at the same time, for recocking lever 449.

If the carriage is improperly stopped at an ordinal position, the lever 449, situated in a slot 445, will prevent an untimely shift of the carriage during operation of the division mechanism. In the event a multiplying cycle of operations is initiated by the dividing mechanism, lever 66 (FIG. 28) will swing into a slot 430 before the lever 449 is withdrawn from slot 445, FIG. 26.

Although a detailed description of a preferred embodiment of the invention has been set forth herein, it is unstood that various changes may be made in size, shape, materials and arrangement, within the spirit and scope of the invention, and that applicant does not wish to be limited by the description but only by the scope of the appended claims.

What I claim is:

1. A motivating device for a calculating machine having a carriage traversing mechanism, a partial product multiplying mechanism and a predetermined quotient dividing mechanism, said motivating device comprising a spring impelled motor means; an output shaft supported for rotation and connected to said motor means for being constantly urged rotatively thereby, first, second and third drive units individual respectively to said dividing, traversing and multiplying mechanisms for actuating the related mechanism, each drive unit comprising cam means and a sun gear at an end portion of said drive unit, said first and third drive units being rotatably mounted on said output shaft so that their sun gear bearing ends are nearest each other; a sleeve rotatably mounted on said output shaft between said first and third drive units; a sun gear fixed to said sleeve at its end nearest said first drive unit sun gear; said second drive unit being rotatably mounted on said sleeve with said second drive unit sun gear being in closest proximity to said third unit sun gear; a selectively disengageable stop means for each drive unit and individual thereto for normally arresting rotation thereof; a first differential comprising a first carrier lever disposed between said second and third drive unit sun gears and secured intermediate its ends to said sleeve for turning together therewith and with said sun gear secured to said sleeve, a pair of first axles rotatably mounted, one at each end portion on said first carrier lever, a first gear and a second gear of larger diameter than said first gear fixed to each first axle so that said first gears are meshed with said third drive unit sun gear and said second gears are meshed with said second drive unit sun gear for rotating said second and third drive units selectively both individually and concurrently upon disengagement of said stop means therefor; and a second differential comprising a second carrier lever fixed intermediate its ends to said output shaft between said first drive unit sun gear and said sun gear connected to said first differential, a pair of second axles rotatably mounted, one at each end portion on said second carrier lever, a third gear and a fourth gear of lesser diameter than said third gear secured to each second axle so that said third gears are meshed with said first drive unit sun gear and said fourth gears are meshed with said sun gear connected to said first differential for rotating said first drive unit and said first differential selectively individually and concurrently upon disengagement respectively of said first drive unit stop means and of said second and third drive unit stop means as aforesaid.

2. A motivating device for a calculating machine comprising carriage shifting mechanism, a partial product multiplying mechanism and a predetermined quotient dividing mechanism, said motivating device comprising a spring impelled motor means, an output shaft supported for rotation and connected with said motor means for being constantly urged rotatively thereby; a sleeve member rotatable on said output shaft, a sun gear secured to said sleeve member for rotating therewith; a drive unit individual respectively to each said mechanism for operating said mechanism and rotatably supported on said shaft, each drive unit comprising cams and a sun gear secured together; a planetary differential gear means interposed adjacent ones of said drive units, the first of said differential means being fixed to said sleeve member for rotating therewith and with said sun gear secured to said sleeve, and the second differential means being fixed to said output shaft for rotating therewith; said second differential means being meshed with the sun gear of the first drive unit and the sun gear connected to said first differential for rotating said first drive unit and said first differential selectively both individually and concurrently, and said first differential means being meshed with the sun gears of the second and third drive units for rotating said second and said third drive units selectively both individually and concurrently, and selectively disengageable stop means individual to and engaging each drive unit, whereby said drive units are operable independently and concurrently in any desired pattern for furnishing resultant drive power for said mechanisms upon disengagement of stop means from the respective drive unit.

3. In a calculating machine having a frame, a drive unit means rotatably supported by said frame and continually under rotative impulsion, said drive unit means comprising a plurality of cams, a shock absorbing stop-start means for said drive unit means for normally arresting rotation of said drive unit means when said drive unit means is rotated to stop position; said stop-start means comprising a first lever pivoted one said frame, a generally right angle extension on said first lever formed with an inclined cam edge, a buffer element secured on said frame in the path of movement thereagainst of said extension and normally stoppingly contacted by said extension, a detent member pivoted on said first lever and engaged with a first of said cams for holding said first lever against said buffer element thereby to arrest said drive unit means at said stop position, said detent member having a cam engaging face and said first cam having a detent engaging face, said faces being so mutually inclined that said first cam acts to rock said detent member out of engagement therewith, a second lever pivoted on said frame and extending generally parallel with said detent member, a lug carried by said second lever contacting said detent member for holding said detent member engaged with said first cam, movable latch means normally in latched engagement with said second lever for releasably holding said second lever for said holding of said detent member in said engagement with said first cam, means for moving said latch out of said latched engagement whereupon said second lever is free to move pivotally with said detent member as said detent member is disengaged from said first cam by said first cam, a third lever pivoted on said frame and extending near said extension, a roller carried by said third lever so as to ride on and along said inclined cam edge of said extension, spring means acting between said third lever and said frame for biasing said roller against said inclined cam edge so that upon said disengagement of said detent member from said first cam said spring means biased roller cooperates with said inclined cam edge to rock said first lever away from said buffer element for carrying said detent member to a forward position relative said drive unit stop position, a pivoted cam follower engageable with said second lever and rockable by a second of said cams for returning said second lever into said latched engagement by said latch means and therethrough returning said detent member into the path of said first cam at said forward position whereat said first cam again engages said detent member and moves said detent member and said first lever against the resistance of said spring means until said first lever extension contacts said buffer element, whereby said spring means serves to diminish the rate of movement of said drive unit for minimizing the shock occurring upon contact of said extension with said buffer element.

4. The construction according to claim 3, wherein said second lever and said cam follower are pivoted coaxially and said cam follower comprises a lateral member in the path of said second lever, said second lever engaging said lateral member upon rocking of said second lever by said detent member when said disengagement of said detent member from said first cam occurs, a cam follower roller carried by said cam follower and engaging the periphery of said second cam, resilient means engaging said second lever and said cam follower for holding said cam follower in said engagement with said second cam, radially projecting peripheral portion so disposed on said second cam that said cam follower effects said return of said detent member into the path of said first cam at said forward position for said stopping of said drive unit at the completion of a 360 degree revolution of said drive unit, a latch supporting stud, said latch means being pivotally mounted on said stud, a latch finger on a distal portion of said latch means, a spring means for yieldably holding said latch finger of said latch means in latching position whereat said latch finger is normally engaged with said second lever to block rocking thereof, and latch disengaging means brought into operation upon commencement of a calculation operation for rocking said latch against the tension of said spring means to disengage said latch from said second lever.

5. The construction according to claim 3. wherein said second lever and cam follower are pivoted coaxially and said cam follower comprises a lateral member in the path of said second lever, said second lever engaging said lateral member upon rocking of said second lever by said detent member when said disengagement of said detent member from said first cam occurs, a cam follower roller carried by said cam follower and engaging the periphery of said second cam, resilient means engaging said second lever and said cam follower for holding said cam follower in said engagement with said second cam, and a radially projected peripheral portion so disposed on said second cam that said cam follower effects said return of said detent member into the path of said first cam at said forward position for said stopping of said drive unit at the completion of a 360-degree revolution of said drive unit.

6. The construction according to claim 3, including a stud, said latch means being pivotally mounted on said stud, a latch finger on a distal portion of said latch means, spring means for yieldably holding said latch means in latching position whereat said latch finger is normally engaged with said second lever to block rocking thereof, and latching disengaging means brought into operation upon commencement of a calculation operation for rocking said latch against the tension of said spring means to disengage said latch from said second lever.

7. The construction according to claim 6 wherein said latch disengaging means comprises a pivotally mounted bellcrank means, a hook means slidably supported at one end on said lug of said second lever, said hook means being pivoted at its other end on said bellcrank means for being pulled endwise upon rotation of said bellcrank means, a hook nose on said hook means intermediate its ends for engaging said latch means for said rocking of said latch means to disengage from said second lever whereupon said lug rocks said hook means to uncouple said hook nose from said latch means, thereby freeing said latch means for being returned to said latching position by said spring means, key means for initiating computation operation and means brought into operation by actuation of said key means for rocking said bellcrank means.

8. The construction according to claim 3, wherein there is adjustment means on said frame and engaging said spring means for varying the resilient effect of said spring means, and said buffer element is adjustably positionable relative to said extension on said first lever.

9. The construction according to claim 3 wherein there is tensioned resilient means acting between said detent member and said first lever for biasing them toward each other and for biasing said detent member into continuous contact with said lug on said second lever and for biasing said detent member in a direction to disengage from said first cam.

10. In a calculating machine in which there is a drive unit means rotatably mounted and continually urged to rotate, a stop-start means for releasably blocking rotation of said drive unit, said stop-start means comprising a first plate member secured to said drive unit for rotation therewith, at least two studs protruding from a face of said first plate member at equiangularly spaced locations thereon, at least two spring seating peripheral projections on said plate member at equiangularly spaced locations thereon, a rockable second plate member adjacent said stud bearing face of said first plate member and formed with concentric lost motion slots, each at a location corresponding to the location of one of said studs, said studs extending through said slots for at times permitting limited angular movement of said first and said second plate members relative to each other, said second plate member having elongated openings thereon, one end of each opening being adjacent one of said projections and the other end of each opening being formed with a spring seating lug extending toward the related projection, a compression spring inserted in each said opening and seated at its ends respectively on said lug and said projection for resiliently holding each of said studs normally against one end of its related lost motion slot, so that said second plate member and first plate member are rotatable together, a stop ear on said second plate member, and a pivoted detent rockable into and out of path of said stop ear for respectively arresting and permitting rotation of said second plate member, said lost motion slots allowing limited rotation of said first plate member relative said second plate member against the resistance of said springs when said stop ear engages with said detent, whereby said springs absorb any resulting stopping shock, and reduce wear on the involved elements.

11. In a calculating machine having a plurality of multi-order registers in an ordinally shiftable carriage, a traversing mechanism for shifting said carriage stepwise, a multiplying mechanism for deriving partial products and registering the same in the register therefor and a dividing mechanism for selecting and entering predetermined trial quotient digits into computation, the combination comprising a plurality of continually impelled rotatable drive units one for each said mechanism, a plurality of stop-start means one for and individual to each of said drive units for normally arresting rotation of said drive unit, selective initiating means operable to disengage each said stop-start means from its related drive unit for permitting rotation of said drive unit, a re-engaging means coupled with each of said stop-start means and operable by said related drive unit to re-engage its said stop-start means with said related drive unit to arrest said drive unit at the completion of a single revolution, a first control means operable by the multiplying mechanism at the completion of a product registration and connected to said shift stop-start means for disengaging the carriage shift stop-start means, a second control means connected to said multiplying stop-start means and responsive to said dividing mechanism when the derived trial quotient is greater than zero for disengaging said multiplying stop-start means from the multiplying drive unit, a third control means connected to said shift stop-start means and operable by said divide drive unit when the derived trial quotient is zero, and a fourth control means connected to said dividing stop-start means and operable by said shift drive unit upon movement of said carriage one ordinal step to the next order for disengaging said dividing stop-start means from said divide drive unit.

12. In an automatic calculating machine having multi-order product and multiplier registers in an ordinally shiftable carriage, traversing mechanism for shifting said carriage stepwise, a multiplying mechanism for deriving products and registering the same selectively additively and subtractively in the product register, overdraft sensing means, effective during division operations, for sensing an overdraft in said product register and for thereupon effecting restoration of the overdrafting amount in said product register and for effecting reduction of the too large quotient digit by one, and a dividing mechanism for selecting and entering into computation predetermined trial quotient digits from zero to nine, the combination comprising a plurality of rotatable drive units, each drive unit being individual to one of said mechanisms for operating the related said mechanism to obtain respectively a product, a trial quotient digit and an ordinal shift of said carriage during a single revolution of each related said drive unit; a motor, differential means connecting said motor and said drive units for rotating said drive units both individually and concurrently and in combinations, said motor continually exerting rotative drive forces on each of said drive units, a plurality of stop-start means one for each drive unit and normally engaged with its drive unit for arresting rotation of said drive unit, a plurality of selectively operable initiating means one for each stop-start means for disengaging said stop-start means from the related drive unit to permit rotation of said drive unit; a first control means operated by the said multiplying mechanism drive unit after a product is registered in said product register for disengaging the carriage traverse drive unit stop-start means to normally initiate an ordinal shift of the carriage; a normally disabled second control means operable by said multiplying mechanism drive unit for disengaging said carriage traverse drive unit stop-start means when an overdrafting product in division operations has been restored and the too large trial quotient is one; a third control means operable by the dividing mechanism drive unit for at times disengaging said carriage traverse drive unit stop-start means, a normally disabled fourth control means operable by said dividing mechanism drive unit for disengaging the multiplying drive unit stop-start means when the trial quotient is a digit greater than zero, a normally disabled fifth control means operable by said multiplying drive unit for disengaging said multiplying drive unit stop-start means to initiate a successive rotation of said multiplying drive unit when an overdraft occurs and the excessively large trial quotient digit is greater than one; disabling means operable by said overdraft sensing means in response to occurrence of an overdraft for first disabling said first control means and for thereupon rendering said fifth control means operable; control coordinating means operable by said dividing mechanism for disabling said third control means and enabling said fourth control means when the trial quotient digit is greater than zero, for rendering said second control means effective when the overdraft producing trial quotient digit is one, and for rendering said fifth control means effective when the reduced trial quotient digit is greater than one, and a sixth control means actuated by said traverse drive unit for disengaging said divide unit stop-start means upon shift of said carriage to the next ordinal position, said sixth control means being effective only during division operations.

13. The construction according to claim 12 and comprising a tabulating means actuated by said carriage upon shift of said carriage to a predetermined one of end ordinal positions and presettable for being actuatable by said carriage at any one of the ordinal positions intermediate said end ordinal positions, and a terminating means operable by said tabulating mechanism to render said carriage traverse drive unit stop-start means unresponsive to said first, second and third control means, thereby to effect termination of division operations upon obtaining a quotient to the full ordinal capacity of said product register when presetting of said tabulating mechanism is not made, and upon obtaining a predetermined limited number of quotient digits when presetting of said tabulating means is made.

14. In a calculating machine having a multiplying mechanism for deriving partial products, a dividing mechanism for deriving trial quotients, an ordinally shiftable carriage, and a traversing mechanism for ordinally shifting said carirage, the combination of a plurality of rotatable drive units one for each of said mechanisms, a continuously impelled motive source for rotating said drive units, a plurality of stop-start means one for each of said drive units and engageable with its related drive unit for arresting rotation thereof and disengageable from said related drive unit for permitting rotation of said drive unit, a plurality of control means one individual to each of said stop-start means and operable to disengage only the related said stop-start means thereby to initiate respectively any one of the dividing, multiplying and carriage shift cycles of operations, an elongated traverse bar secured to said carriage and formed with a series of ordinally disposed discrete locating slots, first and second pivoted lockout means so located that the distal end of each of said lockout means is in alignment with one of said locating slots on said bar at each ordinal position of said carriage, said first lockout means being engaged with the dividing drive unit stop-start means for being rocked by said dividing drive unit stop-start means to enter said aligned locating slot, thereby to permit disengagement of said stop-start means from said dividing drive unit, and said second lockout means being engaged with the multiplying drive unit stop-start means for being rocked by said multiplying drive unit stop-start means to enter said aligned slot, thereby to permit disengagement of said stop-start means from said multiplying drive unit, said rocking of a said lockout means being arrested by said traverse bar only when a said locating slot is displaced relative to said lockout means, whereby said lockout means blocks its related stop-start means from disengaging from its related drive unit, thus indicating unreadiness of the machine for a calculating operation and consequently preventing initiation of any calculating operation until said carriage is traversed to an accurately aligned ordinal position.

15. The construction according to claim 14 wherein said locating slots are open at one end and each said first and second lockout means comprises an arm with a slot entering finger portion receivable in its said locating slot and normally retracted outwardly from said locating slot, said locating slots being formed by mutually parallel spaced opposite marginal edges, and said slot engaging finger portions being of a width substantially equal to the spacing between said marginal edges for cooperating with said marginal edges of the entered said locating slot to constrain said carriage to remain at an accurately aligned ordinal position at all times during a computation cycle of operation.

16. The construction according to claim 15 and comprising spaced stationary guide members defining a guide slot for and individual to said arm of each of said lockout means, each said arm extending through and movable in its related said guide slot for accurately aligned guided movement therein and support thereby against deflection of the respective said lockout means by said carriage, whenever said carriage tends to shift while said lockout means is engaged with a said locating slot.

17. In a calculating machine having a multiplying mechanism for deriving products, an ordinally shiftable register carriage and a traversing mechanism for ordinally shifting said carriage, the combination of a plurality of rotatable drive units, one for each of said mechanisms, a continuously impelled motive source for rotating said drive units, a plurality of stop-start means, one for each of said drive units and engageable with its related drive unit for arresting rotation thereof and disengageable from said related drive unit for permitting rotation of said drive unit, manually operable control means individual to each said stop-start means and operable to disengage only the related said stop-start means, thereby to initiate respectively any one of the multiplying and carriage shift cycles of operations, an elongated transverse bar secured to said carriage for movement therewith and formed with a series of spaced ordinal locating slots, a pivoted lockout means so located that the distal end of said lockout means is always in alignment with a said locating slot on said bar at each ordinal position of said carriage, said lockout means being engaged with said multiplying drive unit stop-start means for being rocked by said multiplying drive unit stop-start means to enter the aligned locating slot, thereby to permit disengagement of said stop-start means from said multiplying drive unit, rocking of said lockout means being arrested by said transverse bar only when no one of said locating slots is in alignment with said lockout means, whereby said lockout means blocks said stop-start means from disengaging from said multiplying drive unit, thus evidencing unreadiness of the machine, due to misalignment of said carriage, for a calculating operation and consequently preventing initiation of calculating operations until said carriage is traversed to accurately align a said locating slot with said lockout means.

18. The construction according to claim 17 wherein said locating slots are a first series of locating slots and said transverse bar is formed with a second series of ordinally spaced locating slots, said multiplying drive unit comprising first and second rotatable cams, means actuated by said first cam for retracting said lockout means from said locating slot of said first series of slots in the initial portion of the revolution of said multiplying drive unit, a multiorder register carried on said carriage and comprising a first gear in each order, a rockable gear carrier in said multiplying mechanism, a plurality of ordinally disposed second gears rotatably mounted on said gear carrier and normally disengaged from said first gears, said gear carrier being engaged with said second cam for being rocked by said second cam to move said second gears into meshed engagement with said first gears before said lockout means is retracted from said slot of said first series of locating slots, said gear carrier comprising a slot entering extension so disposed that at each ordinal position of said carriage said extension aligns with a slot of said second series of locating slots for entering said slot upon rocking of said carrier for said intermeshing of said first and second gears, said slots of said first and second series being formed by mutually parallel spaced opposite marginal edges, said lockout means comprises an arm with slot entering finger portion of a width substantially equal to the spacing between the marginal edges of said first series of slots and said extension being of a width substantially equal to the spacing between the marginal edges of said second series of slots, said lockout means finger portion and said extension cooperating with said marginal edges of the entered related said locating slot to constrain said carriage to remain at an accurately aligned ordinal position at all times while a computation cycle of operations is taking place.

19. A speed governor for a calculating machine having a plurality of operable devices, a continually impelled rotatable drive unit including cams for synchronously actuating all said devices in less than one complete revolution of said drive unit, and a stop-start means normally engaged with said drive unit for arresting rotation of said drive unit and disengageable from said drive unit for permitting rotation of said drive unit, said speed governor comprising a pivoted follower riding on the periphery of one of said cams, resilient means for forcefully biasing said follower against said cam, said cam being so decreasingly sloped along a portion of said periphery that, during the initial part of said one revolution, the follower bias aids rotation of said drive unit until the lowest portion of said periphery is reached by said follower, and the remaining portion of said cam periphery being increasingly sloped so that said follower bias acts to retard any tendency toward acceleration of said drive unit consequent upon lessening of the load on said drive unit during the latter part of said one revolution.

20. A motivating device comprising an output shaft supported for rotation about its axis, motor means engaging said output shaft for rotating said shaft, first, second and third drive unit means carried on said shaft for rotation thereon, each said drive unit means comprising a plurality of means rotatable therewith, transmission means between each of said drive unit means and said output shaft and rotated by said shaft, for operating said drive unit means and stop means for engaging any of said drive unit means for stopping the rotation of said drive unit means.

21. A motivating device comprising an output shaft supported for rotation about its own axis, spring motor means connected to said output shaft for rotating said shaft, a motor connected to said spring motor means for rewinding the same whenever it becomes unwound to a predetermined extent, first, second and third drive unit means all carried on said output shaft for rotation about the axis of said shaft, and each comprising a plurality of cams rotatable with said drive unit means, first, second and third rotary drive connecting means each individual to one of said drive unit means for coupling the related drive unit means to said output shaft, for being rotated by said shaft and first, second and third stop means individual to each said drive unit means for stopping rotation of any related said drive unit means.

22. A stop-start device comprising a shaft means; a first plate means mounted on said shaft means for rotation therewith, a second plate means carried on said shaft means for rotation thereon and located adjacent to said first plate means, and having a stopping ear, a stopping detent pivotally supported near said second plate means and movable from a first position in stopping engagement with said ear for stopping rotation of said second plate means to a retracted second position for releasing said second plate means, said second plate means having a plurality of lost motion slots formed therein at equiangularly spaced locations thereon, a plurality of pins secured to said first plate means for movement therewith and extending into said lost motion slots on said second plate means, for limiting the angular motion of said first and second plate means relative to each other by the extent of said lost motion slots, at least two spring seating peripheral projections on said first plate means at equiangularly spaced locations thereon, said second plate means having elongated spring receiving openings thereon, one end of each spring receiving opening being adjacent to one of said spring seating peripheral projections and the other end of each opening being formed with a spring seating lug extending toward the related said projection, a compression spring inserted in each said spring receiving opening and seated at its ends respectively on said lug and said projection for resiliently holding each of said pins normally against one end of its related lost motion slot, so that said first plate means and second said plate means are rotatable together, and so that said lost motion slots allow limited rotation of said first plate means relative to said second plate means against the resistance of said spring when said stop ear engages with said detent, whereby said springs absorb any resulting stoppage shock.

23. A stop-start device comprising a shaft means, a first plate means mounted on said shaft means for rotation therewith, a second plate means carried on said shaft means for rotation thereon and located adjacent to said first plate means, and having a stopping ear, a stopping detent pivotally supported near said second plate means and movable from retracted first position to second position in stopping engagement with said ear for stopping rotation of said second plate means, said second plate means having at least one lost motion slot formed therein, at least one pin secured to said first plate means for movement therewith and extending into said lost motion slot on said second plate means, for limiting the angular motion of said first and second plate means relative to each other by the extent of said lost motion slot, at least one spring seating peripheral projection on said first plate means, said second plate means having at least one elongated spring receiving opening thereon, one end of said spring receiving opening being adjacent to said spring seating peripheral projection and the other end of said opening being formed with a spring seating lug extending toward said projection, a compression spring inserted in said spring receiving opening and seated at its ends respectively on said lug and said projection for resiliently holding said pin normally against one end of its lost motion slot, so that said first plate means and second said plate means are rotatable together, and so that said lost motion slot allows limited rotation of said first plate means relative to said second plate means against the resistance of said spring when said stop ear engages with said detent, whereby said spring absorbs any resulting stoppage shock.

24. In combination, a frame, an ordinally shiftable carriage means movable from one ordinal position to others on said frame, carriage traversing means for shifting said carriage, an elongated traverse bar secured to said carriage for movement therewith, and formed with a series of ordinally disposed discrete locating slots, first and second pivoted lockout means so located on said frame that the distal end of each lockout means is in alignment with one of said locating slots on said traverse bar at each ordinal position of said carriage so that when said carriage is at an accurately located ordinal position said lockout means are aligned for entry into said locating slots, and block shifting of said carriage and so that when said carriage is out of an accurate ordinal position, entry of said lockout means into said locating slots is blocked.

References Cited in the file of this patent

UNITED STATES PATENTS

| | | |
|---|---|---|
| 1,794,881 | Connell | Mar. 3, 1931 |
| 1,834,406 | La Bar et al. | Dec. 1, 1931 |
| 1,971,680 | Gubelmann | Aug. 28, 1934 |
| 2,431,930 | Grip et al. | Dec. 2, 1947 |
| 2,531,207 | Gang | Nov. 21, 1950 |
| 2,658,684 | Gang | Nov. 10, 1953 |
| 2,793,715 | Fielder et al. | May 28, 1957 |
| 2,808,905 | Bohl | Oct. 8, 1957 |